(12) United States Patent
Nelson

(10) Patent No.: US 6,254,180 B1
(45) Date of Patent: Jul. 3, 2001

(54) BICYCLE SEAT

(75) Inventor: Paul Damien Nelson, Vic (AU)

(73) Assignee: Nelson Seating Pty. Ltd., Mount Waverly (AU)

( * ) Notice: Subject to any disclaimer, the term of this patent is extended or adjusted under 35 U.S.C. 154(b) by 0 days.

(21) Appl. No.: 09/319,683

(22) PCT Filed: Dec. 2, 1997

(86) PCT No.: PCT/AU97/00818

§ 371 Date: Jun. 9, 1999

§ 102(e) Date: Jun. 9, 1999

(87) PCT Pub. No.: WO98/25810

PCT Pub. Date: Jun. 18, 1998

(30) Foreign Application Priority Data

| Dec. 9, 1996 | (AU) | .................................................. | PO 4055 |
| Mar. 12, 1997 | (AU) | .................................................. | PO 5579 |
| Nov. 12, 1997 | (AU) | .................................................. | PP 0315 |

(51) Int. Cl.[7] .................................................. B62J 1/00
(52) U.S. Cl. ........................................... 297/201; 297/202
(58) Field of Search ............................... 297/195.1, 198, 297/201, 202, 214, 209

(56) References Cited

U.S. PATENT DOCUMENTS

| 656,854 | * | 8/1900 | Nord . | |
| 5,011,222 | | 4/1991 | Yates et al. .......................... | 297/195 |
| 5,823,618 | * | 10/1998 | Fox et al. . | |
| 5,927,802 | * | 7/1999 | Kesinger . | |

FOREIGN PATENT DOCUMENTS

| 13213/83 | 4/1983 | (AU) . |
| 689664 | 3/1940 | (DE) . |
| 4424824A1 | 1/1996 | (DE) . |
| 0 603 138 | 6/1994 | (EP) . |
| 0734943A2 | 10/1996 | (EP) . |
| 2 723 905 | 3/1996 | (FR) . |
| 25463 | * 11/1896 | (GB) . |
| 611899 | 12/1948 | (GB) . |
| WO 88/09738 | 12/1988 | (WO) . |
| WO 91/01244 | 2/1991 | (WO) . |
| WO 92/18373 | 10/1992 | (WO) . |
| WO 94/25331 | 11/1994 | (WO) . |

* cited by examiner

Primary Examiner—Milton Nelson, Jr.
(74) Attorney, Agent, or Firm—Clark & Elbing LLP

(57) ABSTRACT

A bicycle seat is shown which includes a shell (11) formed from plastics material which has two buttock support portions (12 and 14) separated by a slot (16). The shell (18) includes a nose portion (18) and the transition between the support portions (12 and 14) and the nose portions (18) forms hinges (20 and 22) for allowing the support portions (12 and 14) to move independently with respect to one another in arcuate fashion during pedalling motion of the bicycle. A support rail (40) is coupled to the underside of the shell (18) and may have free ends (145) which act as stops to limit the amount of movement of the support portions (12 and 14). Springs (184, 190) may be provided between the mounting rail (40) and the shell (11). In other embodiments (FIGS. 42 to 80), the seal may include chambers for receiving air to cushion and provide support for a rider.

22 Claims, 17 Drawing Sheets

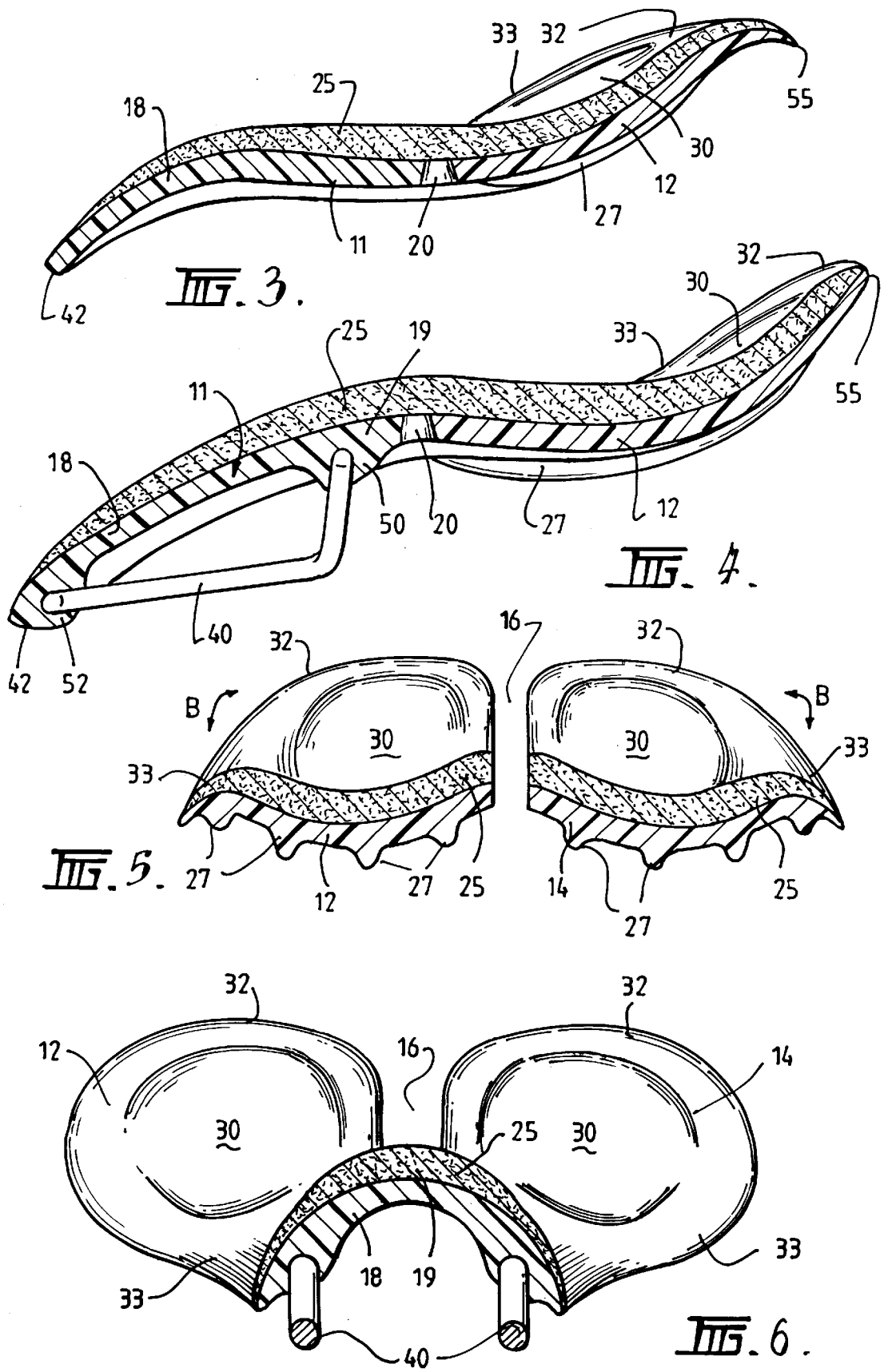

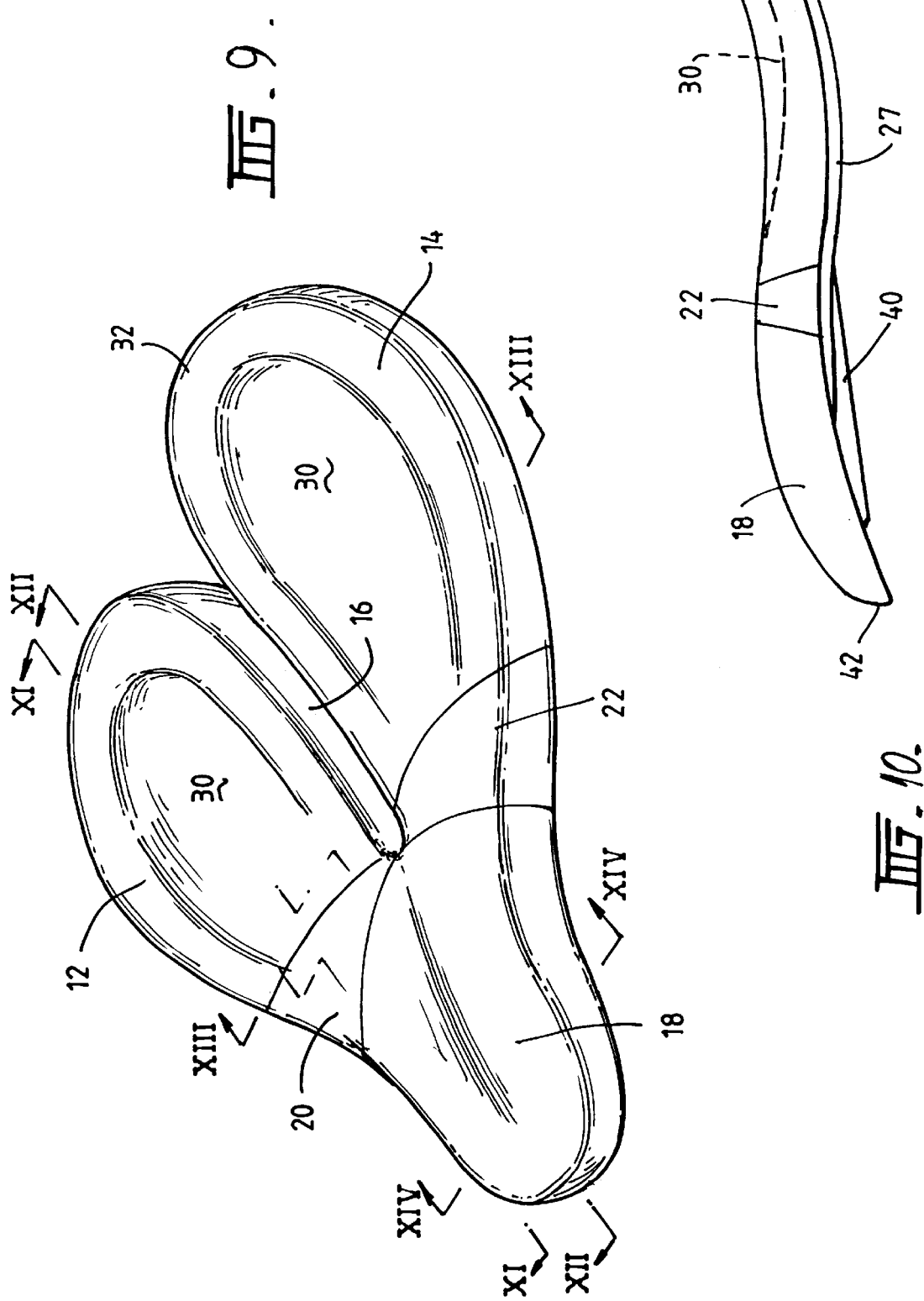

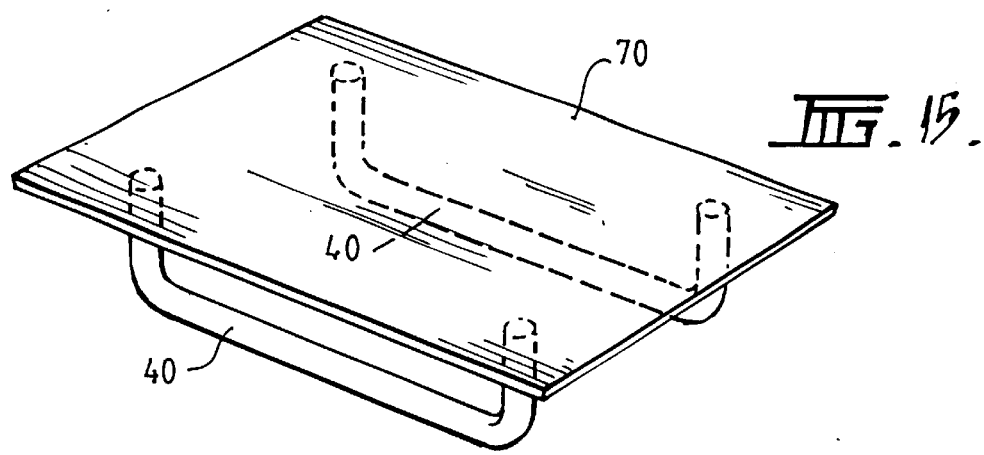
FIG. 15.
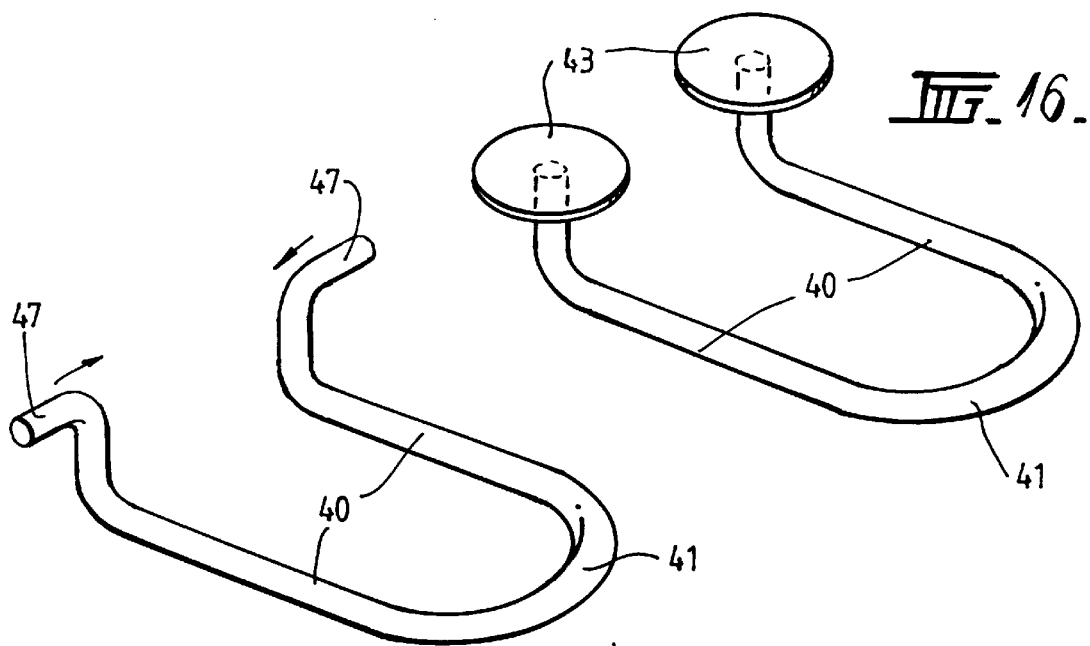
FIG. 16.
FIG. 17.
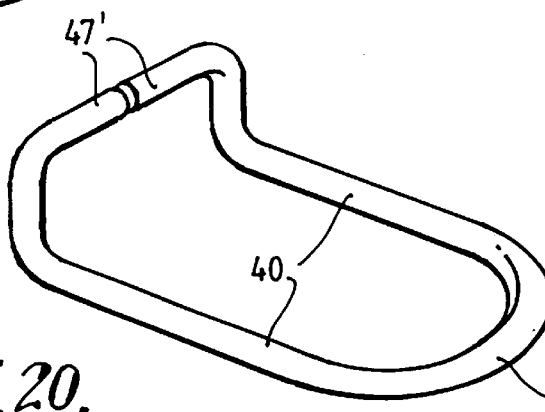
FIG. 20.

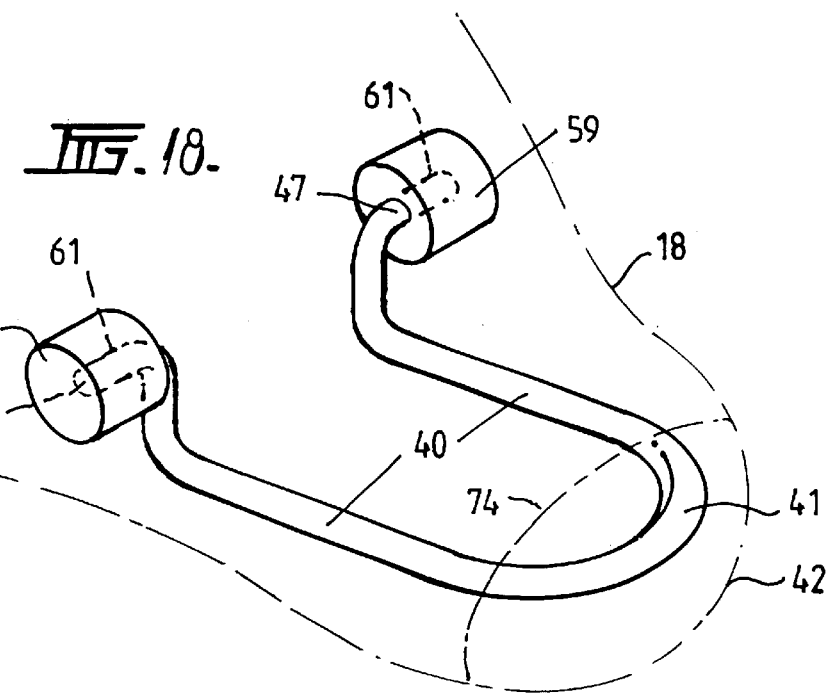
FIG. 18.
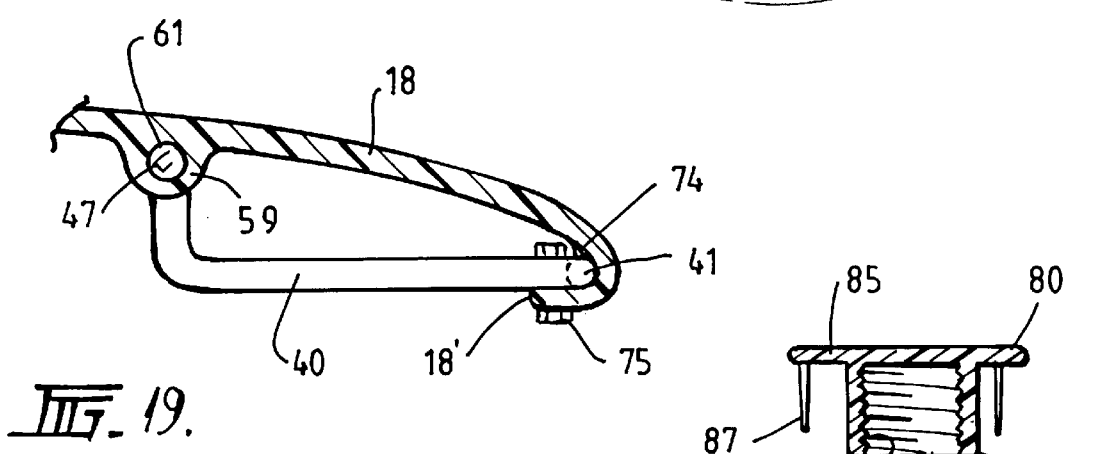
FIG. 19.
FIG. 21.
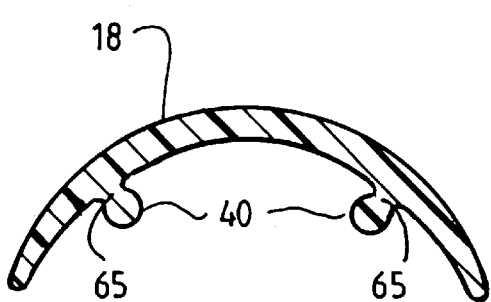
FIG. 22.

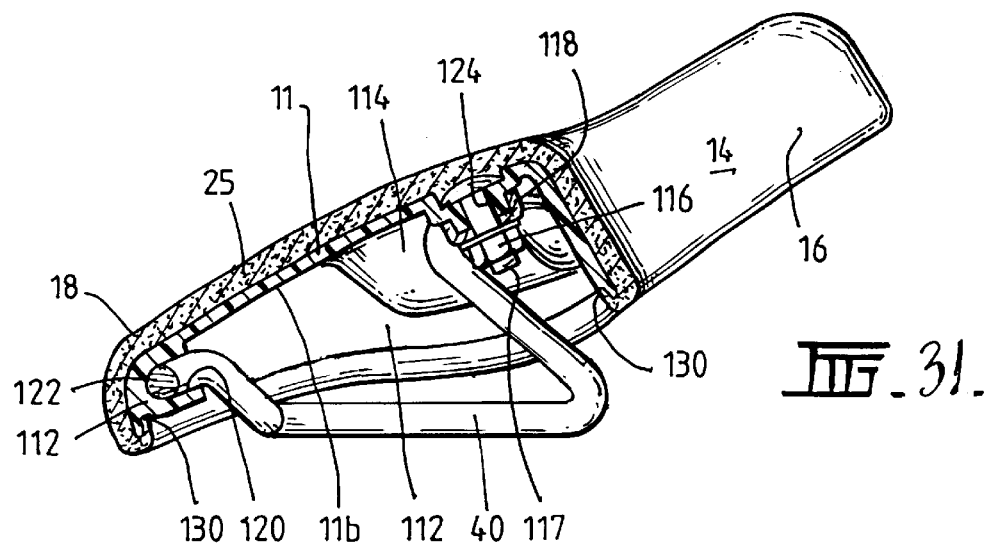
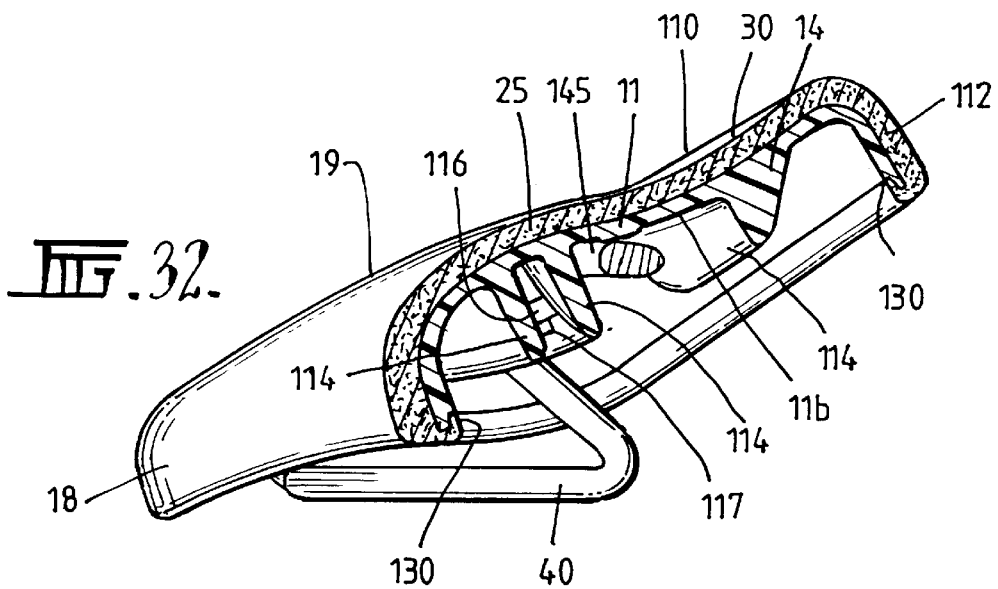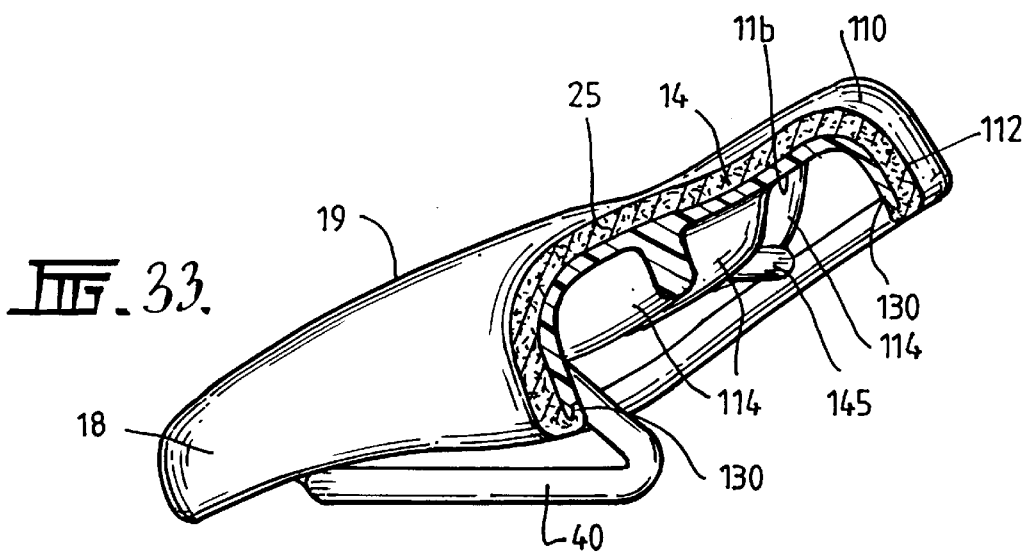

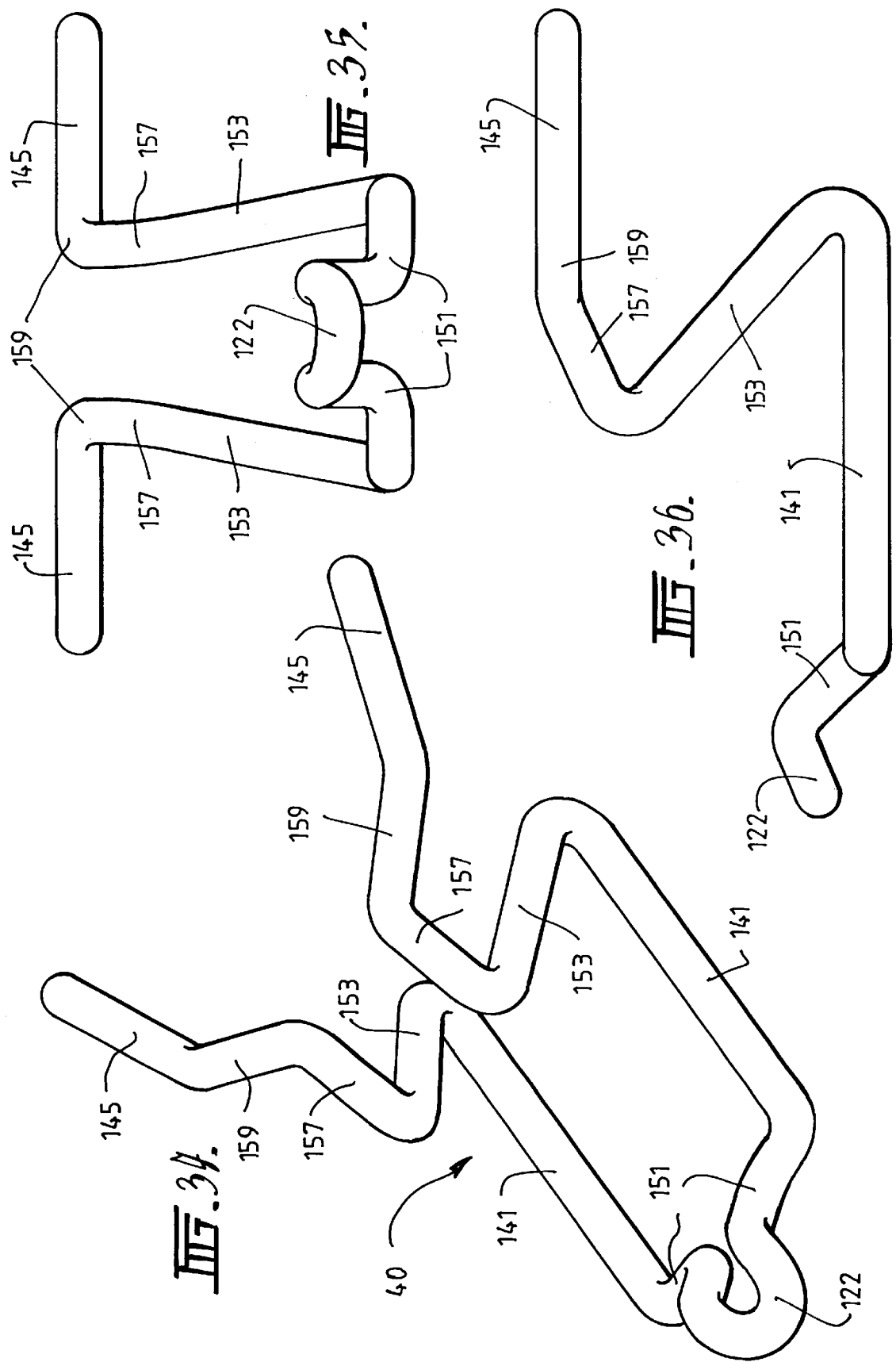

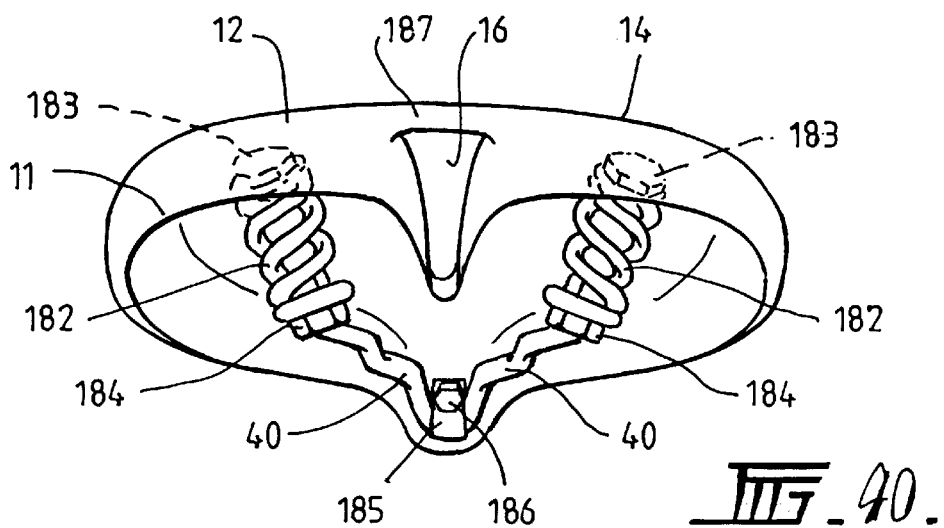
FIG_40.
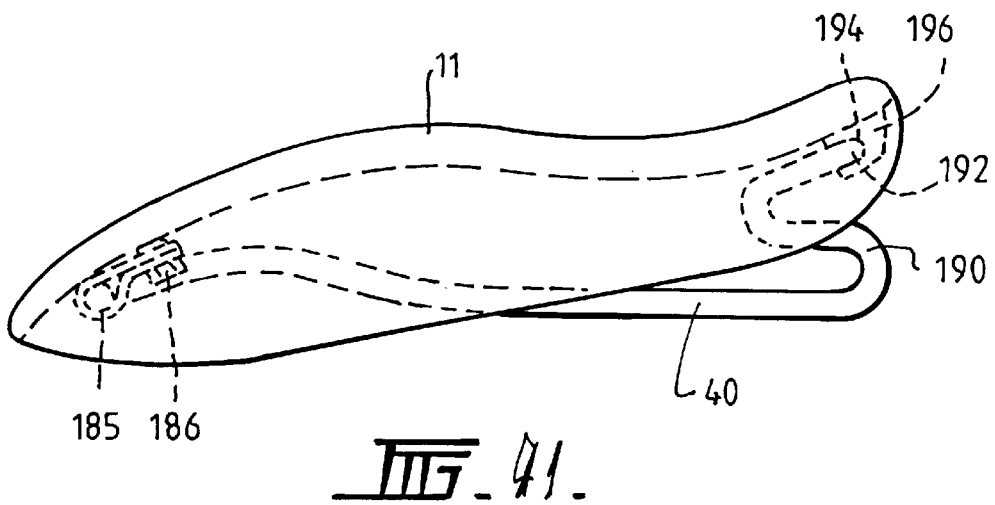
FIG_41.
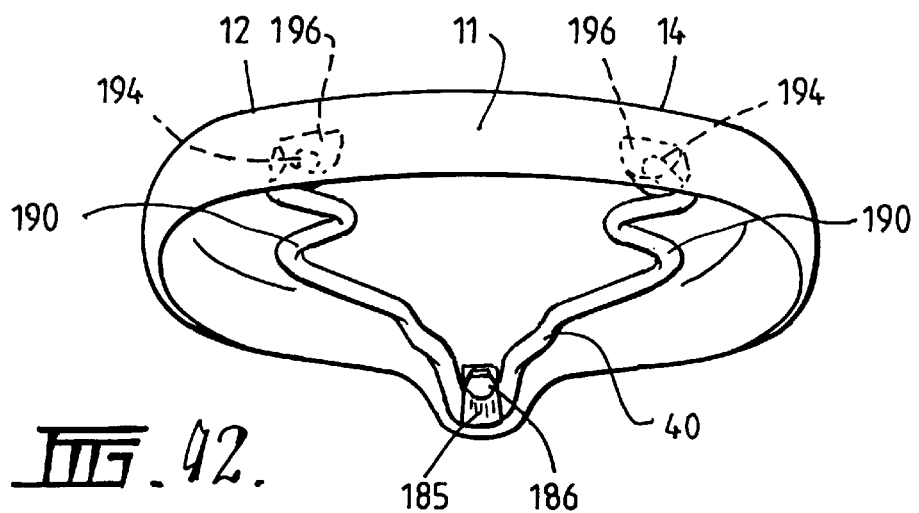
FIG_42.

BICYCLE SEAT

This invention relates to a support system and in particular to a bicycle seat.

The present invention is an improvement or modification to the seat as disclosed in my international application PCT/AU96/00273 and my international application PCT/AU94/00284. The contents of these earlier international applications are incorporated into this specification by this reference.

This invention may be said, in the first aspect, to reside in a support system, including;
- a first support portion and a second support portion for receiving a riders buttocks; and
- and a hinge for allowing each of the first and second support portions to undergo independent arcuate movement having a component at least in a substantially vertical plane when the rider is seated on the support portions and performing a pedalling motion.

This invention may also be said, in the first aspect, to reside in a support system, including;
- a first support portion and a second support portion for receiving a riders buttocks;
- a front portion coupled to the first and second support portions; and
- and a hinge between the first and second support portions and the front portion for allowing each of the first and second support portions to undergo substantially independent arcuate movement having a component at least in a substantially vertical plane when the rider is seated on the support portions and performing a pedalling motion.

According to this aspect of the invention the independent arcuate movement of the support portions provides both comfort and energy return to the person when the person is seated on the support portion and performing a pedalling motion such as that performed when riding a bicycle. Furthermore because of the movement of the support portions friction is reduced which in turn reduces chaffing.

Preferably the first and second support portions are separated by a longitudinal slot. However, in other embodiments the first and second support portions could be connected by a thin longitudinal hinge member so the first and second portions are formed on a single support member and wherein the longitudinal hinge allows independent arcuate movement of the first and second support portions.

Preferably the hinge comprises a first hinge between the first support portion and the front portion and a second between the second support portion and the front portion.

Preferably the support system includes an integral shell which includes the first and second support portions, the front portion and the hinge with the hinge being defined by a transition between the support portions and the front portion.

In the embodiment of the invention where the support system includes the integral shell, the integral shell including the hinge is preferably formed from a resilient plastics material such as nylon 6, 6 polycarbonate, polyethylene or the like so that the first and second support portions can move in the arcuate direction by flexure of the hinge and the resilient nature of the material will cause the first and second support portions to tend to return to their initial position as load is removed from them during pedalling motion.

Preferably the shell is provided with upholstery which covers the shell.

Preferably the support system has connecting means for connecting the support system to an article, the connecting means being coupled to the front portion between a front end of the front portion and the hinge so as not to interfere with flexing movement of the hinge and the arcuate movement of the first and second support portions.

Preferably the connecting means comprise connecting rails.

In one embodiment the connecting rails are coupled to the shell by embedding portions of the rails into the shell when the shell is formed. In other embodiments the rails may be coupled to the shell by securement members which are attached to the shell or which are formed integral with the shell. In still further embodiments the rails may be formed integral with the shell.

Preferably support portions are cupped shaped for receiving the ischial bone region and buttock region of a rider.

Preferably the front portion comprises a truncated nose.

In one embodiment the front portion includes a soft padding to extend the length of the truncated nose. In this embodiment the soft padding merely collapses when contacted by a rider so that the front portion has the appearance of a conventional bicycle seat with an elongated nose but the front portion preforms little or no vertical support function for a rider. In this embodiment, the front portion may provide some lateral support function to assist in stability and centring of the rider on the seat.

A further aspect of the invention may be said to reside in a support system including;
- first and second support portions, the first and second support portions-each having a depression for receiving the ischial regions of a persons anatomy;
- a raised portion between and forward of the depressions of the first and second support portions, for receiving the ramus of the ischial regions or the ischial regions of a persons anatomy;
- and a nose section which extends forwardly of the support portions and which declines from the support portions towards a front end of the nose section.

In this aspect of the invention the support is configured so that most of the riders weight will be centred on the ischial bones and buttock region of the rider and supported in the depressions of the first and second support portions. This therefore decreases the amount of compression of the users anatomy other than the vicinity of the ischial bones to increase comfort and prevent significant pressure from being applied to other portions of the buttocks outside the ischial region.

Preferably the first and second support portions are separated by an elongated slot.

Preferably the first and second support portions and the front portion are integral with one another by being made as an integral shell.

Preferably the support portion includes upholstery on the shell.

A further aspect of the invention may be said to reside in a support system, including;
- a support portion for receiving a users buttocks;
- a truncated nose extending forwardly from the support portion;
- a soft collapsible upholstery member provided on the nose portion for extending the nose portion forwardly and/or upwardly with respect to the support portions.

According to this aspect of the invention the self collapsible member on the nose portion gives the seat the appearance of a conventional bicycle seat but nevertheless performs little or no vertical support function because of the collapsibility of the material when pressure is applied to it.

This reduces pressure to the soft tissue of the nose section against a user when on the support system. The soft collapsible material provides a centring member so that a person can centre him or herself on the support portion relative to the truncated nose and the collapsible material and truncated nose may also provide some lateral support to assist centring and stability of a rider when seated on the support system.

The self collapsible material may be a foam or sponge material or polyurethane or the like.

Preferably the support portions and truncated nose are formed as a integral shell from plastics materials such as nylon 6,6 polycarbonate, polyethylene or like material.

The invention may also be said to reside in a bicycle seat, including:
- a unitary shell having a nose portion and a rear portion, the shell being formed from a flexible material;
- a slot in the rear portion dividing the rear portion into two separate support portions; and
- each of the support portions being independently movable relative to the nose portion and each other by flexure of the flexible material from which the shell is formed so that a transition between the two separate support portions and the nose portion forms a hinge allowing the two separate support portions to undergo substantially independently movement when a rider is seated on the bicycle seat and pedalling a bicycle.

Preferably the bicycle seat includes a cushioning skin over an upper surface of the unitary shell.

Preferably the shell has an upper surface and a lower surface, a plurality of ribs projecting from the lower surface.

Preferably a mounting rail is coupled to the lower surface of the shell.

In one embodiment of the invention, the mounting rail extends to a position below the support portions and a spring is arranged between the mounting rail and each support portion.

The spring may be a coil spring which is connected to the mounting rail and to the shell.

In other embodiments, the spring may be integral with the mounting rail and be defined by a curved or bent portion of the mounting rail.

Preferably the nose portion has an undercut for receiving a front portion of the mounting rail to secure the front portion of the mounting rail to the shell.

Preferably stop means is provided for limiting movement of the two support portions.

Preferably the stop means comprise end portions of the mounting bracket which are spaced from the lower surface of the shell.

A further aspect of the invention may be said to reside in a bicycle seat, including:
- a nose portion;
- a rear support portion coupled to the nose portion, the rear support portion having first and second support portions;
- a hinge for allowing each of the first and second support portions to undergo substantially independent movement relative to one another and the nose portion, the independent arcuate movement having a component at least in a substantially vertical plane when the rider is seated on the support portions and forming a pedalling motion; and
- stop means for limiting the amount of movement of the first and second support portions.

Preferably the bicycle seat includes a mounting rail for mounting the seat to a bicycle and the stop means comprises end portions of the mounting rail which are spaced from the first and second support portions and positioned below the first and second support portions.

The invention in a further aspect may be said to reside in a bicycle seat, including:
- a nose portion;
- a rear portion for receiving a rider's buttocks;
- the nose portion and rear support portion having an upper surface and a lower surface;
- a mounting rail coupled to the lower surface;
- a cut-out in the nose portion for receiving a front portion of the mounting rail to hold the front portion of the mounting rail to the bicycle seat; and
- securing means for securing the mounting rail to the lower surface substantially at a middle portion of the lower surface so the rear portion is free and not connected to the mounting rail.

Preferably the securing means comprises a bracket and bolt and nut for clamping the mounting rail to the lower surface.

Preferably the bolt is embedded in the shell for receiving the nut and the bracket to couple the bracket and therefore the mounting rail to the bicycle seat.

In a further aspect, the invention may be said to reside in a support system including:
- an inflatable housing which defines a chamber for receiving a fluid; and
- wherein when a user is supported by the support system and moves, fluid is caused to move from one part of the housing to another part of the housing so that the said one part can change its shape and/or form and the fluid flow to said another part causes the said another part to change its shape and/or form in response to the change in fluid in said another part of the housing.

Thus, with the support system according to this aspect of the invention, when a user is supported by the support system and the user moves, fluid is caused to move from one part to another part to change the shape of the support system to facilitate support. In one embodiment the support system is a bicycle seat. In the case of a bicycle seat, as a user is pedalling, movement of the legs and buttocks during pedalling can place an increase in pressure on one part of the seat so that fluid is forced from that part to another part which has less pressure on it so that that part can expand so as to maintain some contact and support of the user notwithstanding the reduction in pressure applied by the user during riding. The fluid can basically move back and forward as the rider pedals to result in one part of the seat collapsing and then reinflating as the fluid moves back and forward during pedaling so that various parts of the seat collapse under the weight of the user or expand to maintain contact of the seat with the user and mimic movement of the user as the user pedals the bicycle.

Preferably the housing includes a fluid inlet in the housing for enabling fluid to enter the housing.

Preferably the housing includes rigid sections so that the general shape of the housing is maintained notwithstanding the fact that the housing is able to expand or collapse during movement of the user on the seat.

The housing may be a single chamber which changes form. However, preferably the housing includes two housing portions joined by a fluid passage so that when fluid passes from one part of the housing to the another part of the housing, the fluid passes through the fluid passage to thereby direct the fluid to particular parts of the housing for expansion of those parts of the housing. By selecting the position of the fluid passage, various parts of the housing can be made to expand more or less than others depending on the particular use of the seat or needs of a particular user.

Preferably the housing is made from elastomeric material such as rubber, elasticated plastic or like stretchable material to enable expansion and contraction of the housing as the fluid moves from one part of the housing to another part of the housing.

Preferably the seat has a base plate for supporting the housing.

Preferably the base plate has attachment means for attaching the seat to an article.

Preferably the attachment means comprises a pair of rails.

Preferably the seat is a bicycle seat but in other embodiments, the seat could be a lounge chair or like seat, or a medical application appliance such as a therapeutic or rehabilitation or harness like appliance.

A still further aspect of the invention may be said to reside in a support system including:
 a first portion;
 a second portion;
  the first and second portions being coupled to one another by spring material so that the first portion can move in response to a user's weight and/or pressure applied by a user when a user is supported by the support system and return as a user moves and reduces pressure and/or weight on that portion of the support system.

Thus, in this aspect of the invention, the support system is also able to generally follow the movement of the user's anatomy as the user moves on the support system.

Preferably the first portion of the support system includes two separate sections.

Preferably the first portion of the support system and the second portion of the support system are formed from spring material and the hinge is an integral part of the support system forming a transition between the first and second portions.

In another embodiment of the support system, the first and second portions may be formed from non-spring material and be coupled together by a hinge section formed from spring material.

A further aspect of the invention may be said to reside in a support system, including:
 an abutment portion within the support system;
 biasing means for biasing the abutment portion relative to the support system so that the abutment portion can move relative to the support system; and
 the biasing means providing a floating support for the abutment portions so that the abutment portion can move relative to the support system against the bias of the biasing means in response to the weight or pressure of a user when supported by the support system.

The biasing means may comprise a pad or block of resilient material, a spring, or air, for biasing the abutment portion relative to the support system.

In one embodiment, the support system is a seat and includes a cover member for covering the seat surface portion and the abutment portion.

In one embodiment of the invention, the seat includes a single abutment portion which may be in the pubic area. However, in other embodiments, two or more abutment portions could be used. Furthermore, the abutment portion or abutment portions may be arranged at different positions on the seat to provide different support characteristics depending on the position at which the abutment portion is located.

In one embodiment of the invention, the abutment portions are disc-shaped and in the embodiment where the biasing means comprises air, the abutment members may be hollow members formed from elastic material to enable expansion of the abutment members so as to move the abutment portion relative to the seat surface portion, or alternatively the biasing means may be an inflatable chamber below the abutment portion.

The biasing means may also be in the form of an air spring.

In other embodiments, the abutment portions may be ramp-shaped so as to form an inclined abutment portion.

According to a still further aspect of the invention there is provided a support system, including:
 at least two separate chambers in the support system; and
 a fluid inlet to each of the chambers for allowing fluid to enter each of the chambers.

This aspect of the invention enables the at least two chambers to be inflated by fluid to different degrees to provide different support characteristics at the location of the two chambers.

A further aspect of the present invention may be said to reside in a support system including:.
 an inflatable abutment portion coupled to the support system;
 a fluid inlet to the inflatable abutment portion for coupling with a fluid reservoir for retaining a supply of fluid; and
 fluid control means for allowing flow of fluid from the fluid reservoir to the inflatable abutment portion.

This aspect of the invention enables an inflatable abutment portion to be inflated to provide an abutment for high performance racing o r the like or to merely change the setting surface characteristics of the support system to suit a user. The fluid control means enables a certain amount of fluid to be supplied to the inflatable abutment portion to either fully inflate the abutment portion so that the abutment portion effectively forms a generally rigid abutment portion or to partially inflate the abutment portion so that the abutment portion is able to move under the weight and/or pressure of a user and to follow the change in contour of a user's anatomy as a user moves on the support system.

Preferably the fluid reservoir is coupled to the control means.

In the preferred embodiments of the invention, the fluid which is supplied to the housing or which is used to inflate the abutment portion(s) comprises air but in some embodiments of the invention if it is desired to minimise weight, a lighter gas such as helium could be utilised.

Once again, in the preferred embodiment, the support system is a bicycle seat.

In other embodiments, the gas may be some other gas applicable to particular types of fluid reservoirs such as carbon dioxide cartridges or the like, nitrogen or the reservoir may be a chamber manually inflated with air by a pump or the like.

A still further aspect of the invention provides a support system including:
 a support portion; and
 at least one abutment portion in the support portion, the abutment portion being a fluid chamber for containing a fluid.

Preferably the fluid chamber includes a fluid inlet and the fluid chamber is an inflatable chamber.

A still further aspect of the invention provides a support system including:
 an abutment portion coupled to the support system;

fluid receiving means for moving the abutment portion relative to the support system; and fluid control means for controlling the application of fluid to the fluid receiving means to provide a desired amount of movement of the abutment portion and/or lock of the abutment portion in a desired position relative to the support portion.

Preferred embodiments of the invention are described, by way of example, with reference to the accompanying drawings, in which:

FIG. 3 is a view along the line III—III of FIG. 1;

FIG. 4 is a view along the line IV—IV of FIG. 1;

FIG. 5 is a view along the line V—V of FIG. 1;

FIG. 6 is a view along the line VI—VI of FIG. 1;

FIG. 9 is a top perspective view of a bicycle seat according to a third embodiment of the invention;

FIG. 10 is side view of the seat of FIG. 9;

FIGS. 15, 16, 17, 18, 19, 20, 21 and 22 are views various mounting rails for connecting the bicycle seat of the preferred embodiments to a bicycle;

FIG. 30 is a side view of the embodiment of FIG. 23;

FIG. 31 is a view along the line D—D of FIG. 23;

FIG. 32 is a view along the line E—E of FIG. 23;

FIG. 33 is a view along the line F—F of FIG. 23;

FIG. 34 is a perspective view of a mounting raised used in the embodiment of FIG. 23;

FIG. 35 is a front view of the mounting rail of FIG. 34;

FIG. 36 is a side view of the mounting rail of FIG. 34;

FIG. 40 is a rear view of the embodiment of FIG. 37;

FIG. 41 is a side view of a further embodiment;

FIG. 42 is a rear view of a still further embodiment;

Figure 1:
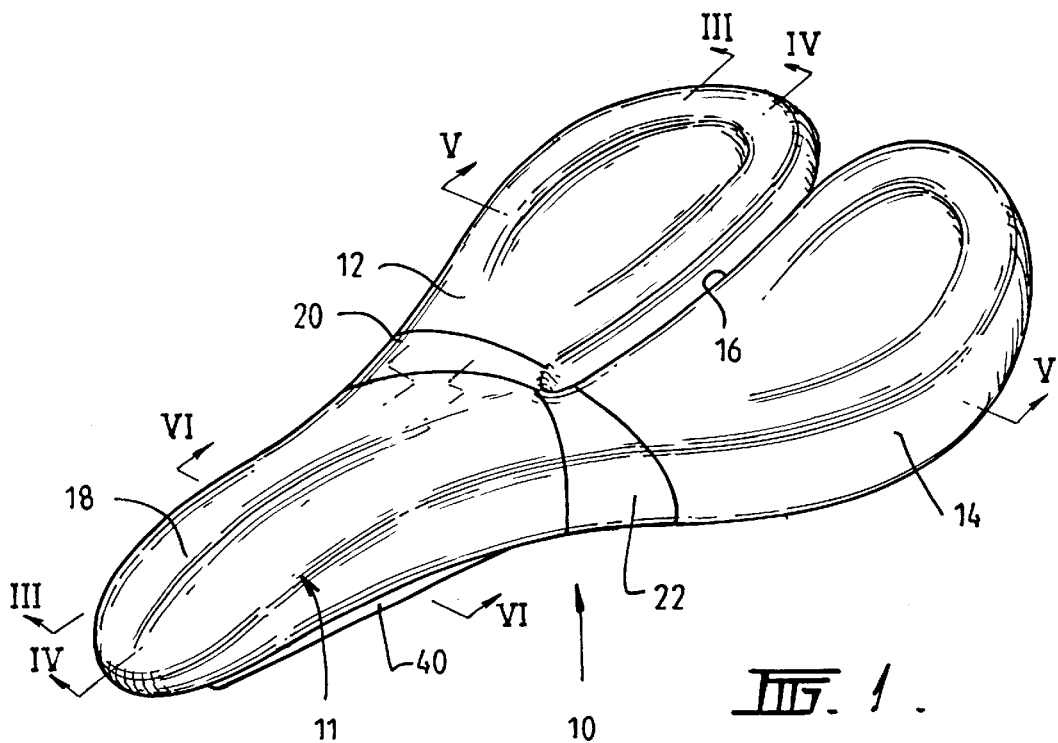
FIG. 1 is top perspective of a bicycle seat embodying the invention.

With reference to FIGS. 1 and 6, a bicycle seat 10 is shown which has an integral shell 11 including first and second support portions 12 and 14 which are separated by a longitudinal slot 16. The shell 11 also has a front portion 18 which forms a nose of the seat 10 and which is integrally coupled to the support portions 12 and 14.

The nose 18 and support portions 12 and 14 are coupled together by first and second hinges 20 and 22 which are also integral with the nose 18 and support portions 12 and 14 and which are formed by a transition between the nose 18 and support portions 12 and 14.

The shell 11 may be covered by upholstery 25 (see FIGS. 3, 4, 5 and 6) which is formed from conventional padding material.

In the preferred embodiment of the invention where the hinges 20 and 22 are integral with the remainder of the shell 11, the shell is formed from a flexible material, for example, plastics material such as nylon 6,6 polycarbonate or polyethylene so that the combined effect of the slot 16 and the transition from the nose portion 18 to the support portions 12 and 14 allows flexing movement of the support portions 12 and 14 about the hinges 20 and 22 relative to the front portion 18. However, in other embodiments the hinges 20 and 22 could be formed from suitable flexible material which is connected to separate front portion 18 and support portions 12 and 14 which, in turn, are formed from rigid material. Further still, in other embodiments rather than providing the slot 16 a thin narrow longitudinal hinge line (not shown) may be provided between the portions 12 and 14 so that the portions 12 and 14 are effectively formed as a single member with the portions 12 and 14 being able to move independently with respect to one another about the longitudinal hinge which joins the support portions 12 and 14.

The support portions 12 and 14 are a mirror image with respect to one another and, as will be evident from the cross-sectional views forming FIGS. 3 to 6, have a depression or recess 30 so that they are generally cupped shaped in configuration so as to snugly receive a portion of a riders buttocks adjacent the ischial bones. As is also apparent in FIG. 2 the portions 12 and 14 incline upwardly slightly relative to the front portion 18.

The support portions 12 and 14 may also be provided on the underside of the shell 11 with a plurality of integral ribs 27 which extend from a rear end of the support portions 12 and 14 to a position rearwardly of the hinges 20 and 22 as can be clearly seen in FIGS. 3 and 4.

Figure 2:
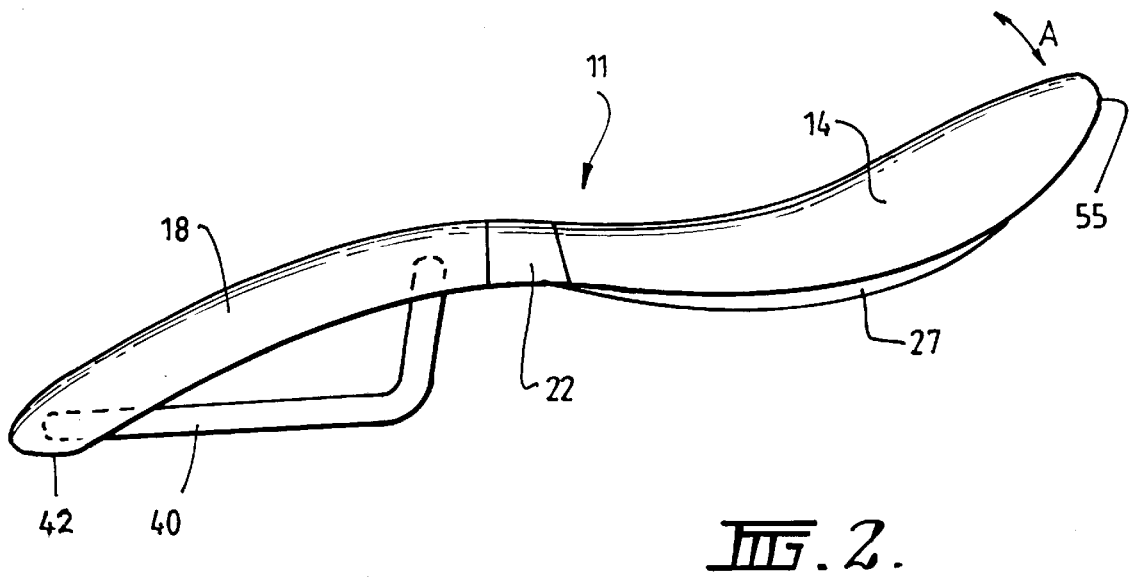
FIG. 2 is a side view of the seat of FIG. 1.

As is best seen in FIGS. 3 to 6 the portions 12 and 14 (only the portion 12 being shown in FIGS. 3 and 4) have a rim 32 which surrounds-the depressions or recesses 30. The rim 32 has a downwardly curved outer edge 33. As also shown in FIG. 2 a connecting rail 40 is coupled to the seat 10. The rail 40 is connected between the hinges 20 and 22 and front end 42 of the nose 18 so that the rail 40 is confined to the nose 18 and does not interfere with movement of the hinge 22 or support portions 12 and 14. Thus, when the rail 40 is coupled to a bicycle to secure the seat 10 to the bicycle (in a manner which is known) the front portion 18 is held substantially still and the support portions 12 and 14 are able to move by flexing movement of hinges 20 and 22 relative to the front portion 18.

As is best shown in FIG. 4 the shell 11 may be provided with an enlarged thickness portion 50 just forward of the hinges 20 and 22 and also an enlarged thickness portion 52 at the front end 42 of the nose 18. The enlarged thickness areas 50 and 52 can provide bosses for receiving the rails 40 to secure the rails 40 to the shell 11. Preferred methods of connecting the rails 40 to the shell 11 will be described in more detail hereinafter with reference to FIGS. 15 to 22.

Figure 12:
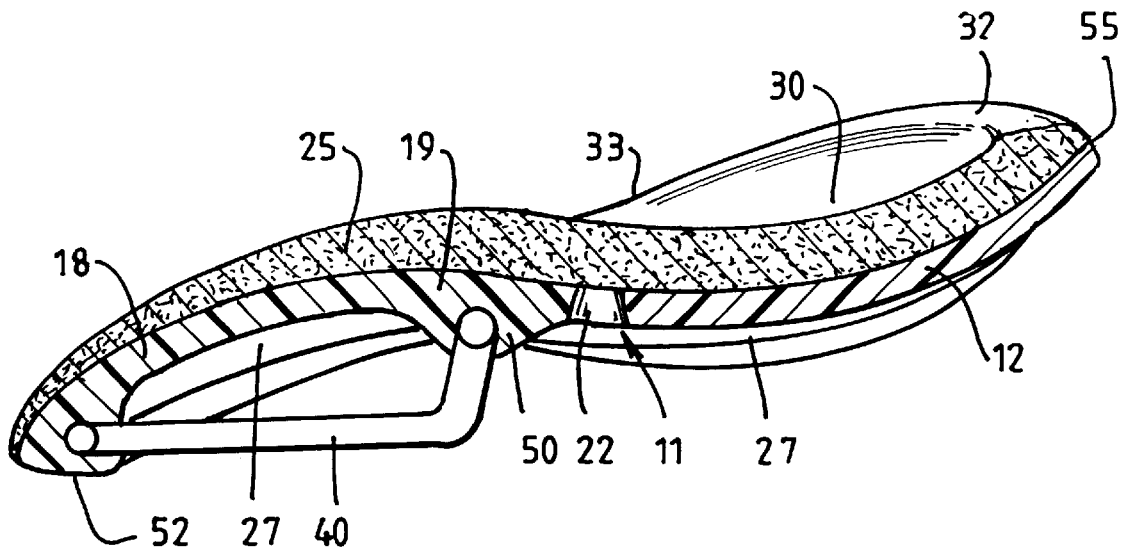
FIG. 12 is a view along the line XII—XII of FIG. 9.
Figure 13:
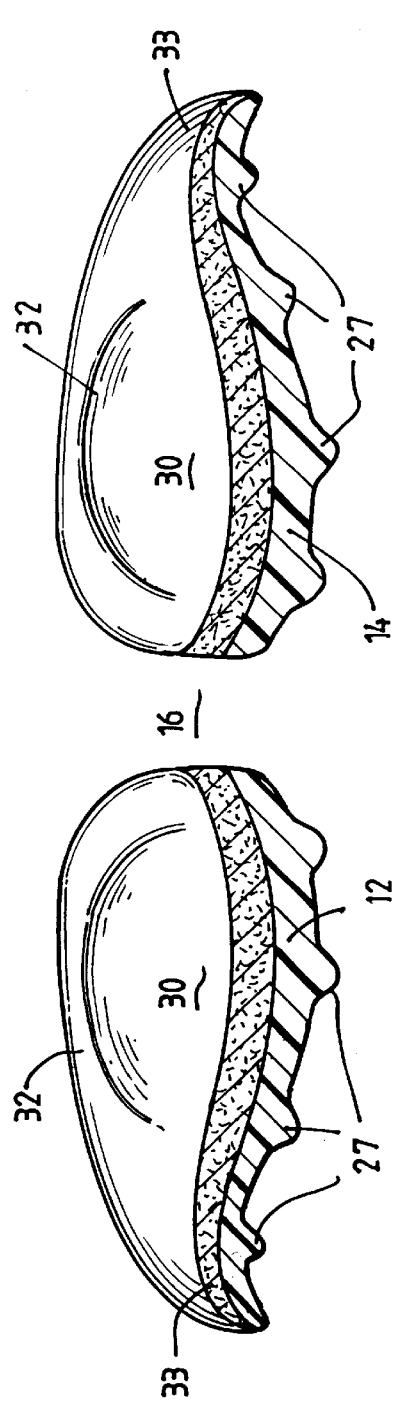
FIG. 13 is a view along the line XIII—XIII of FIG. 9.
Figure 14:
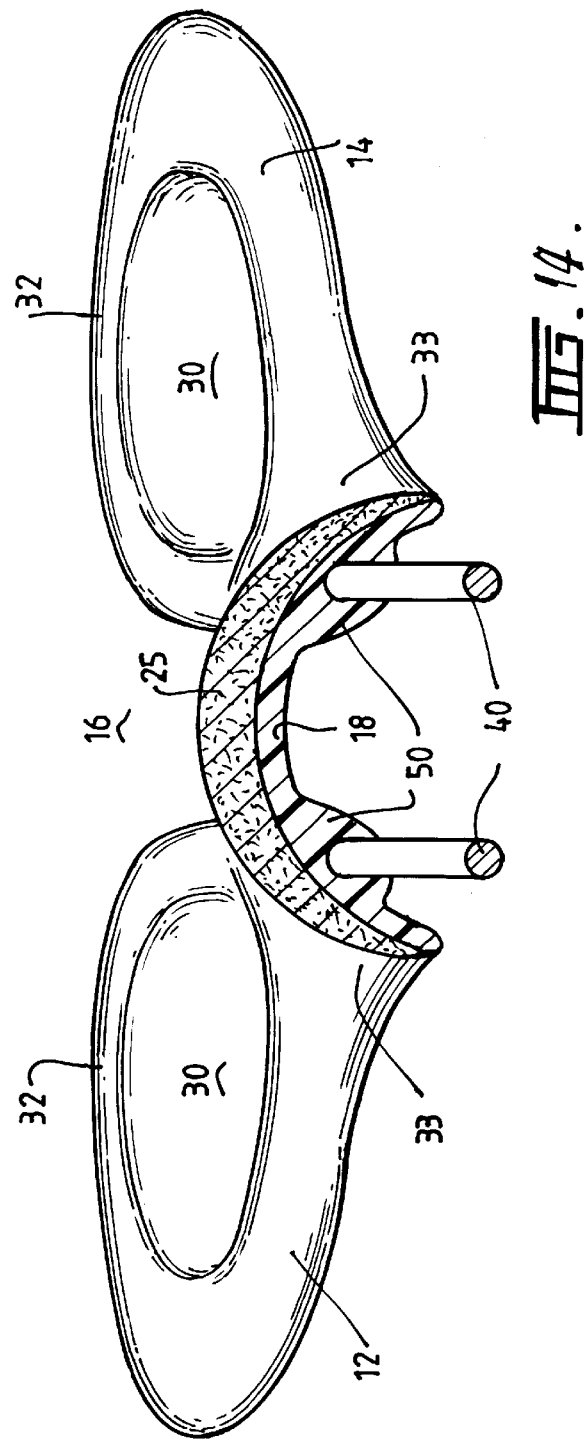
FIG. 14 is a view along the line XIV—XIV of FIG. 9.

As is best shown in FIG. 6 the nose 18 is preferably of inverted U-shape in cross-section and forms a raised portion 19 between the depressions or recesses 30 of the support portions 12 and 14. As best shown in FIGS. 12 and 4 the nose 18 is angled downwardly from the hinges 20 and 22.

When a rider is seated on the bicycle seat of FIGS. 1 to 6 and commences pedalling motion the movement of the buttocks of the rider during pedalling will cause general oscillating movement of the support portions 12 and 14 about hinges 20 and 22 independently of one another so that the portions 12 and 14 move in an arcuate manner as shown by arrow A in FIG. 2. The arcuate movement is mainly in a substantially vertical plane which is parallel to the longitudinal axis of the bicycle so that the arcuate movement has a major component in that vertical plane. However, some lateral movement of the portions 12 and 14 may also take place as shown by arrows B in FIG. 5 so that the arcuate movement also has a component in a generally vertically plane which is perpendicular to the longitudinal axis of the bicycle. Thus, the arcuate movement in the vertical plane which is perpendicular to the axis of the bicycle is generally a minor component movement compared to the arcuate movement which is in the plane parallel to the longitudinal axis of the bicycle.

The arcuate movement of the support portions 12 and 14 provides comfortable support for the rider as the rider pedals the bicycle and also some energy return back into the users body due to the generally spring action or flexing provided by the hinges 20 and 22 which tends to return the portions 12 and 14 to their starting position as the rider moves. Thus, the rider is comfortably supported in an energy sufficient manner for pedalling of the bicycle.

In the embodiments of FIGS. 1 to 6 the seat 10 has the appearance of a generally conventional long nosed bicycle seat apart from the slot 16. If the slot 16 is covered by the upholstery material the seated embodiments of FIGS. 1 to 6 would, for intense purposes, look like any conventional long nosed leather bicycle seat but with a downwardly curved nose.

Figure 7:
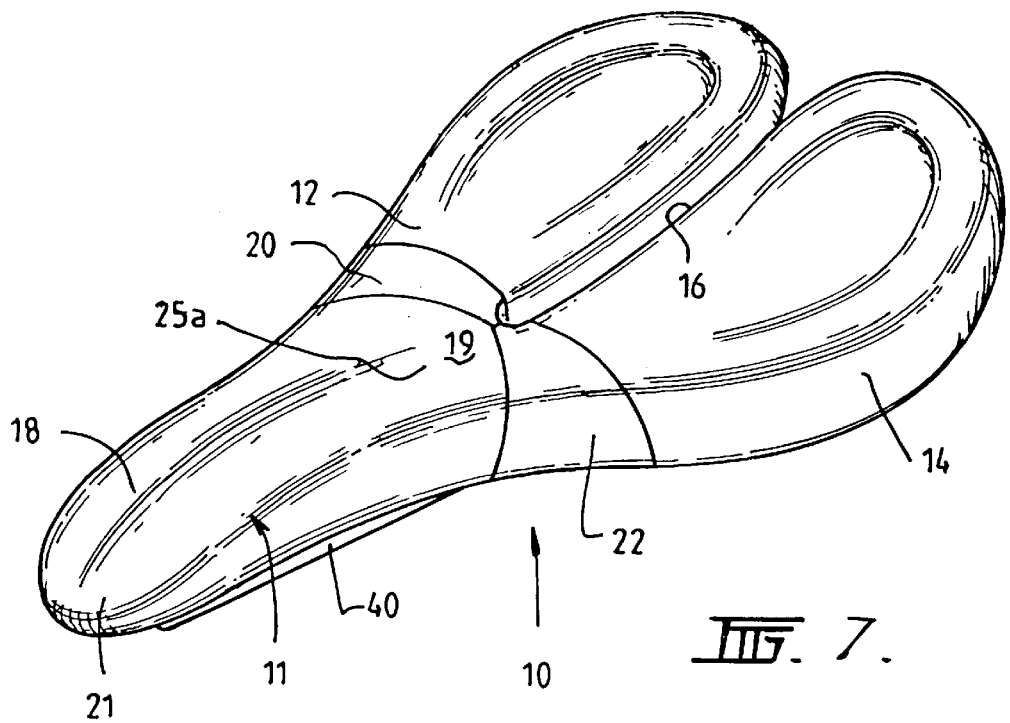
FIG. 7 is a top perspective view of a bicycle seat according to a second embodiment of the invention.
Figure 8:
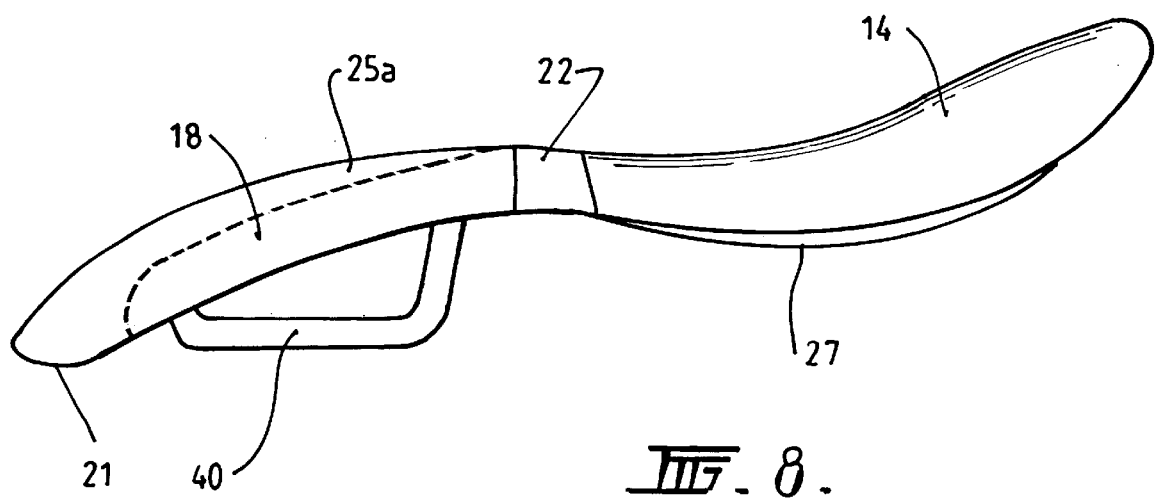
FIG. 8 is a side view of the seat of FIG. 7.
Figure 11:
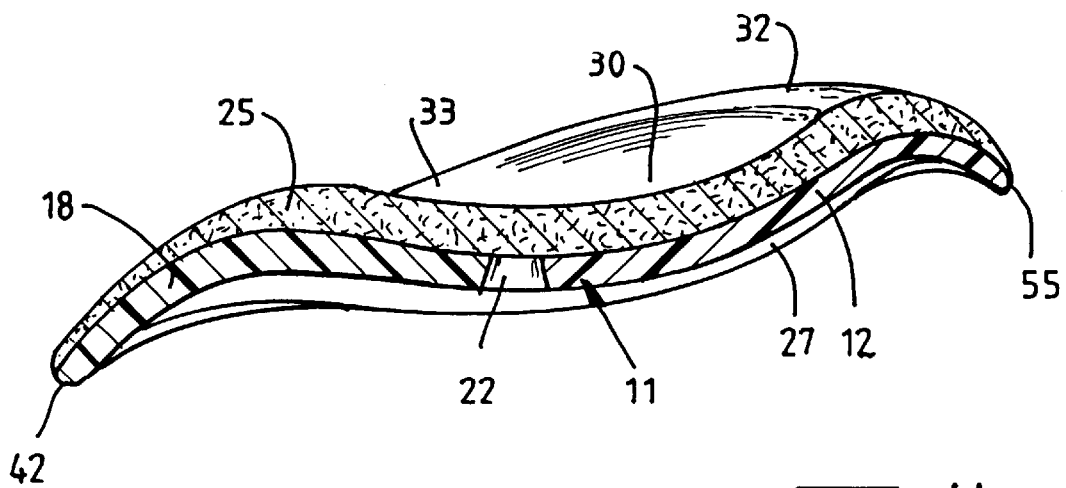
FIG. 11 is a view along the line XI—XI of FIG. 9.

The embodiment of the invention shown in FIGS. 7 and 8 has the same general appearance as the embodiment of FIGS. 1 to 6 and is structured identically to FIGS. 1 to 6 except that the front portion 18 of the shell 11 is in the form of a truncated nose 18 which is much shorter than the nose 18 in the embodiments of FIGS. 1 to 6. In the embodiments of FIGS. 7 and 8 the upholstery 25a is much thicker in the front portion 21 of the seat 10 and effectively extends the length of the front 21 so that the front portion 21 has the same appearance as the nose 18 in FIGS. 1 to 6. However, the upholstery 25a which is in the vicinity of the nose 18 and extends the length of the front portion 21 in the embodiment of FIGS. 7 and 8 is of a very soft material such as soft foam or sponge material, "nerf" type material, polyethylene or like material so that it will readily collapse as soon as the user places any weight on it at all. Thus, the front portion 21 in embodiments of FIGS. 7 and 8 provides little or no support in the vertical direction and therefore reduces the pressure of the soft tissue of a rider when pedalling. The purpose of the soft upholstery portion 25a in the embodiments 7 and 8 gives the appearance of a conventional seat whilst at the same time reducing the support function of the nose 18 and also therefore reduces pressure to soft tissue.

The front portion 21 in the embodiment of FIGS. 7 and 8 does provide some centring datum so that the rider can properly centre himself on the support portions 12 and 14 relative to the front portion 21 and also provide some lateral stability for the rider when seated on the seat and during cornering. Nevertheless, the general support provided by the front portion 21 in the embodiments of FIGS. 7 and 8 is intended to be considerably less than that provided in the previous embodiment and the very soft upholstery material 25a is intended to collapse when weight is applied to it so as to basically form no load bearing function thereby reducing any chaffing which the nose portion of a bicycle seat normally produces.

Apart from the inclusion of the truncated nose section 18 and the relatively thicker yet softer upholstery material 25a in the front portion 21 the bicycle seat of FIGS. 7 and 8 functions in exactly the same manner as that of FIGS. 1 to 6.

FIGS. 9 and 10 show a third embodiment of the invention which is also similar to FIGS. 1 to 6 except that in this embodiment the front portion 18 is in the form of a truncated nose 18 substantially identical to that of FIGS. 7 and 8. However, in this embodiment the elongated soft upholstery material of FIGS. 7 and 8 is not provided so that the seat has the appearance of a very short nosed seat as is evident from FIGS. 9 and 10.

As is shown in FIGS. 11 to 14 upholstery material 25 is provided and generally follows the contour of the shell 11 of FIGS. 9 and 10 similar to the upholstery 25 in FIGS. 1 to 6.

In the embodiments of FIGS. 9 to 14 the ribs 27 run the entire length of the shell 11 from rear 55 to front end 42 and the support portion 12 and 14 are slightly wide then in the embodiment of FIGS. 1 to 6.

The hinges 20 and 22 at support portion 12 and 14 of the embodiment of FIGS. 9 to 14 operates in precisely the same manner as in the embodiment of FIGS. 1 to 6.

FIGS. 15 to 22 show preferred ways of coupling the mounting rails 40 to the shell 11 of the bicycle seat 10. In FIG. 15 a plate 70 is provided and rails 40 are connected to the plate 70. The plate 70 can be bolted or glued to shell 11 or can be embedded in the shell 11 between the hinges 20 and 22 and the front 42 of the nose 18 during moulding of the shell 11.

FIG. 16 shows a slightly different configuration of the rails 40 in which the rails 40 are formed from a single piece having a U-shaped transition 41. The ends of the rails 40 are provided with circular plates 43 which can be embedded in the shell 11 when the shell is moulded.

FIG. 17 shows an embodiment similar to that shown in FIGS. 3 and 4 where the rails 40 have laterally projecting ends 47 which are received in the thickened portions 50. The ends 47 may be embedded in the thickened portions 50 when the shell 11 is moulded or alternatively holes may be provided in the thickened portions 50 for receiving the ends 47. The U-shaped transition 41 can be received in a slot in portion 52.

The distance between the thickened portions 50 and 52 and the size of the rails 40 may be such that when the rails 40 are located in place they are placed under slight tension to securely maintain the rails 40 in place on the shell 11.

FIG. 18 shows an embodiment in which the nose 18 has moulded to it two generally cylindrical bosses 59 which are provided with holes 61 for receiving the ends 47 of the rails 40. The transition 41 of the rails may be received in slot 74 at the front 42 of the nose 18.

FIG. 19 is a side view of the nose 18 and rails 40 according to the embodiment of FIG. 18 more clearly showing the location of the transition portion 41 in the slot 74. In this embodiment a fastener 75 may be located through a return portion 18' of the nose 18 to securely hold the transition portion 41 of the rails 40 in place in the slot 74.

FIG. 20 merely shows a different embodiment of the rail 40 wherein the rail is provided with ends 47' which are turned inwardly in the opposite direction to the direction of the ends 47 in FIGS. 17, 18 and 19. In this embodiment the transition portion 41 is square in shape rather than U-shaped as in the earlier embodiments. The legs 47' could be embedded in the shell 11 during the moulding.

FIG. 21 shows a further embodiment in which a stud 80 can be embedded in the shell 11 when the shell 11 is formed. The stud 80 has a sleeve 82 having screw threads 83. Stud 80 also has a base 85 which has prongs 87 which embed in the shell 11 to securely locate the stud in place. The rails 40 are provided with screw threads 40' on a free end thereof which screw into the screw threads 83 in the sleeves 82.

FIG. 22 shows a further embodiment in which the rails 40 are formed integrally with the nose 18 from the same material as the nose 18. In this embodiment the rails 40 have integral legs 65 which extend between the rails 40 and the nose 18 to couple the rails to the shell 11. The embodiment of FIG. 1 is a sleeker design for more high performance applications and may be relatively light whereas FIG. 9 is designed more for additional lateral width for recreational purposes.

FIGS. 23 to 36 show a fourth embodiment of the invention in which like reference numerals indicate like parts to those previously described.

As in the previous embodiments the seat is formed from a shell 11 of resilient material such as injection moulded plastics material, for example, nylon 6,6 or polypropylene. An upholstery 25 may be provided over the upper surface 11a of the shell 11 as will be described in more detail hereinafter.

The shell 11 has rear buttock support portions 12 and 14 separated by a slot 16 and a front nose portion 18. Once again an integral hinge-is formed in the regions 20 and 22 between the support portions 12 and 14 and the nose 18 so that the support portions 12 and 14 can undergo independent arcuate movement relative to one another and also the nose section 18 in the same manner as has been previously described.

The support portions 12 and 14 are slightly dish-shaped in the areas 30 and rise upwardly to the portion 19 and also upper peripheral edge 110 which delimits the rear support portions 12 and 14. The contouring will be more fully described and apparent from the cross-sectional drawings which will be described hereinafter.

Figure 24:
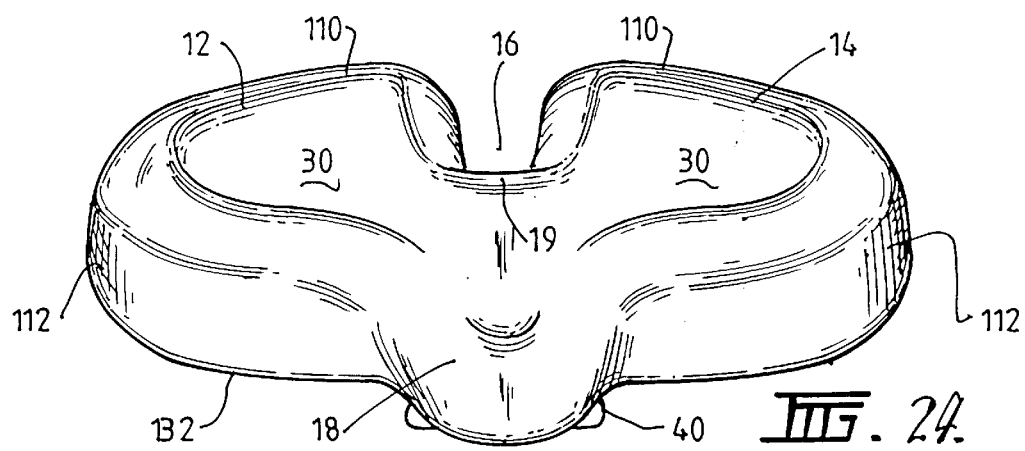
FIG. 24 is a front view of the embodiment of FIG. 23.
Figure 25:
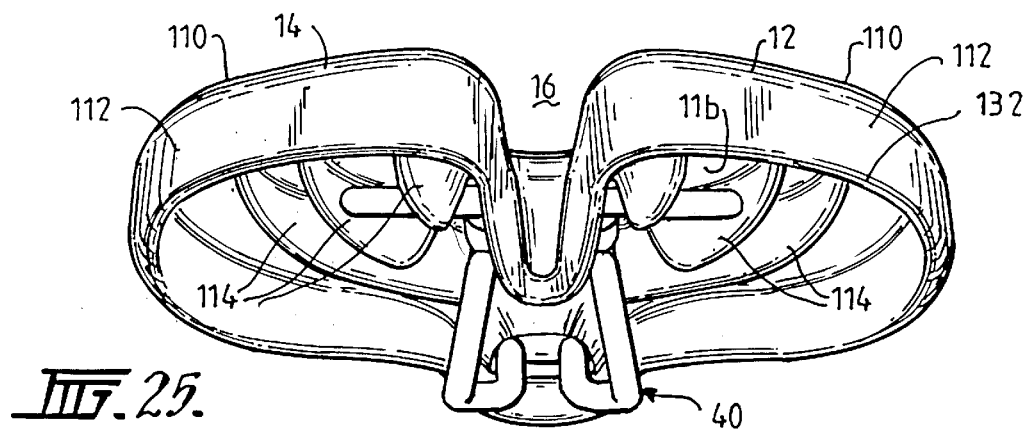
FIG. 25 is a rear view of the embodiment of FIG. 23.
Figure 29:
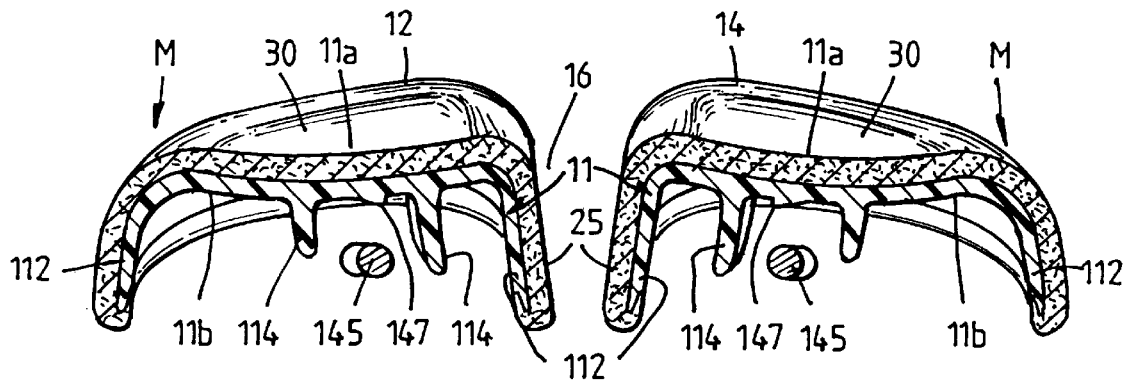
FIG. 29 is a view along the line C—C of FIG. 23.

As is clear from FIGS. 24 and 25 the shell 11 also includes a downwardly projecting skirt portion 112 which extends about the periphery of the seat from upper peripheral edge 110 to lower extremity 132. The skirt portion 112 is of greatest height at the side of the seat as shown in FIGS. 29 and 31, slightly of less height at the rear as shown in FIG. 32 and of lowermost height at the front portion of the nose 18 as shown in FIG. 31.

Figure 26:
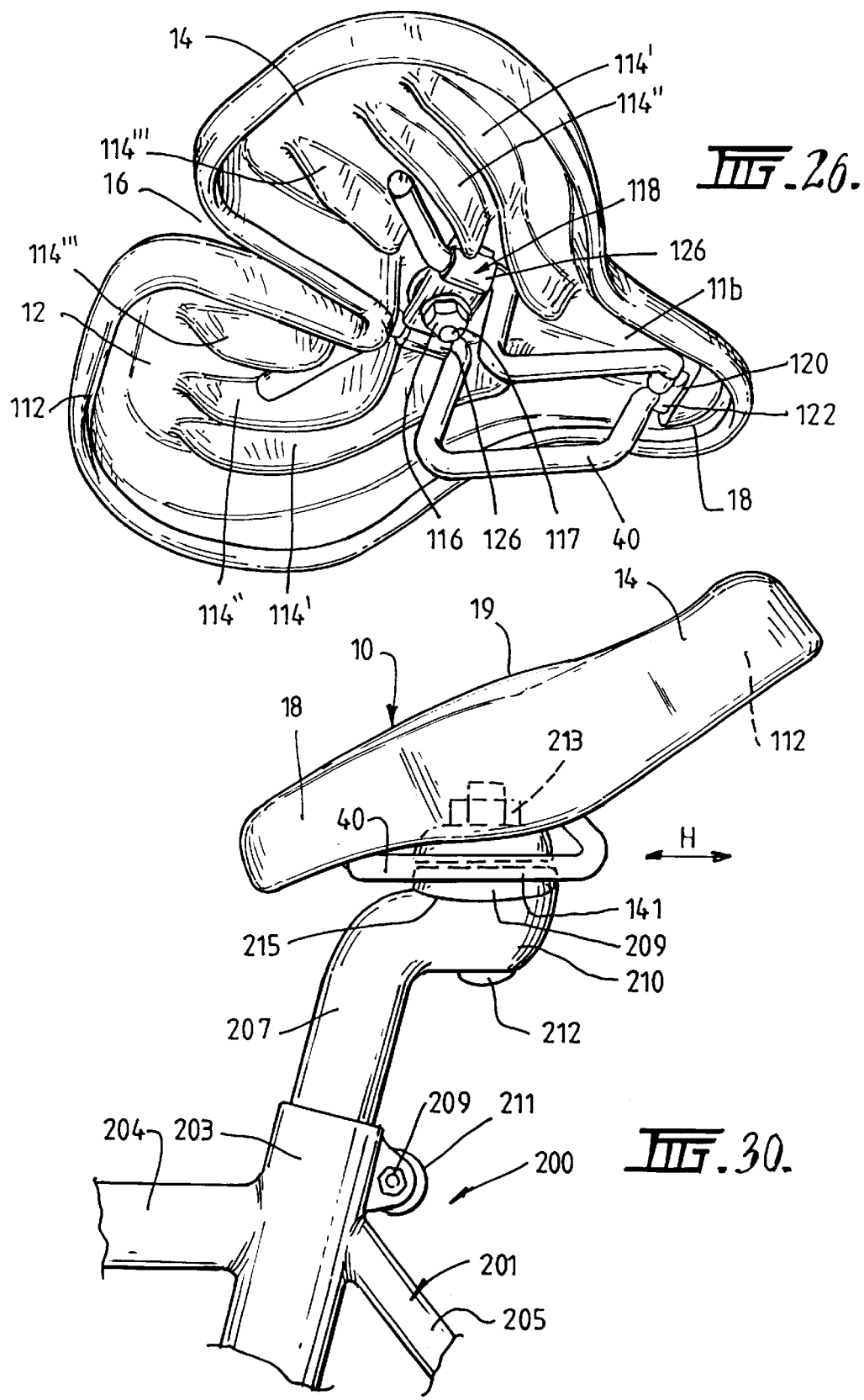
FIG. 26 is an underneath view of the embodiment of FIG. 23.

As is apparent from FIGS. 25 and 26 the lower surface 11b of the shell 11 has downwardly projecting ribs 114. The ribs 114 are of generally curved contour and outermost rib 114' (see FIG. 26) is somewhat longer than the middle rib 114" which, in turn, is somewhat longer than the innermost rib 114'" of each of the support sections 12 and 14.

As shown in FIG. 26 mounting rail 40 is secured to the lower surface 11b by a nut 116 and bracket 118. A bolt 117 is embedded in the shell 11 for receiving the nut 116 (as best seen in FIG. 31). The shell 11 has a cut-out 120 which receives a front portion 122 of the rail 40 as will be described in more detail hereinafter to secure the front portion 122 of the rail 40 to the shell 11.

The bracket 118 clamps the rail 40 to the lower surface 11b of the shell 11. The bracket 118 may have curved sections 126 for accommodating the rail 40 and securely fastening the rail 40 to the shell 11. The lower surface 11b of the shell may also have guide projections or groove 145a (FIG. 28) for correctly positioning the rail 40. The rail. 40 will be more fully described with reference to FIGS. 34 to 36.

Figure 23:
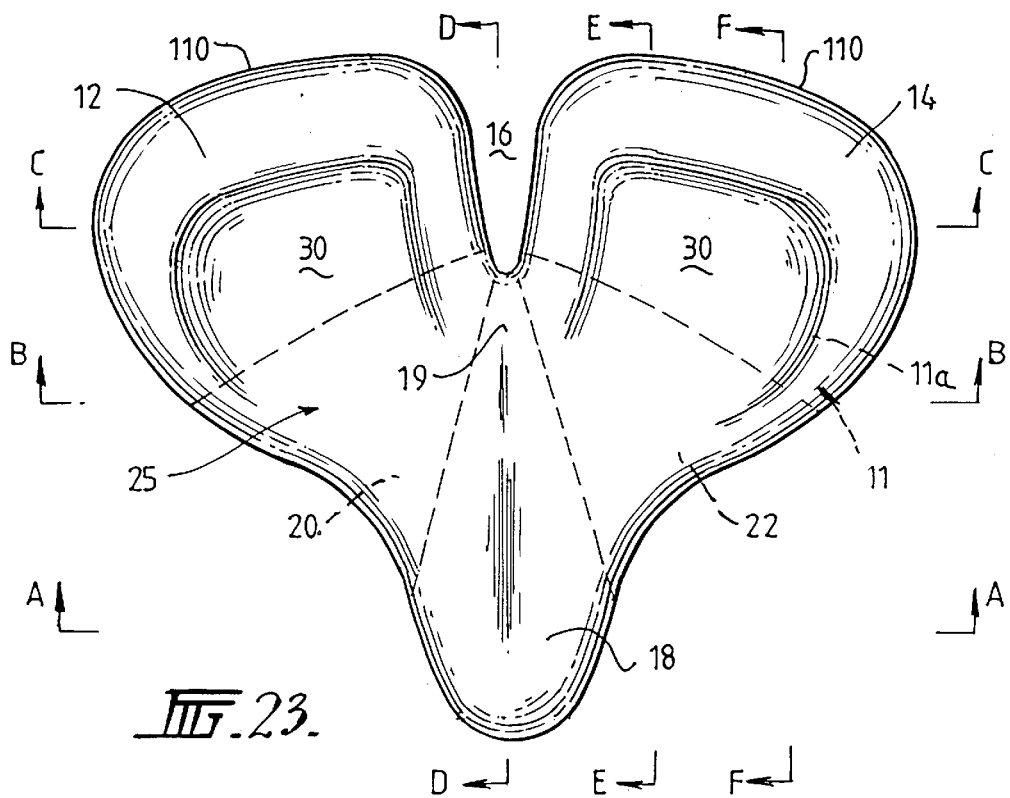
FIG. 23 is a plan view of a further embodiment of the invention.
Figure 27:
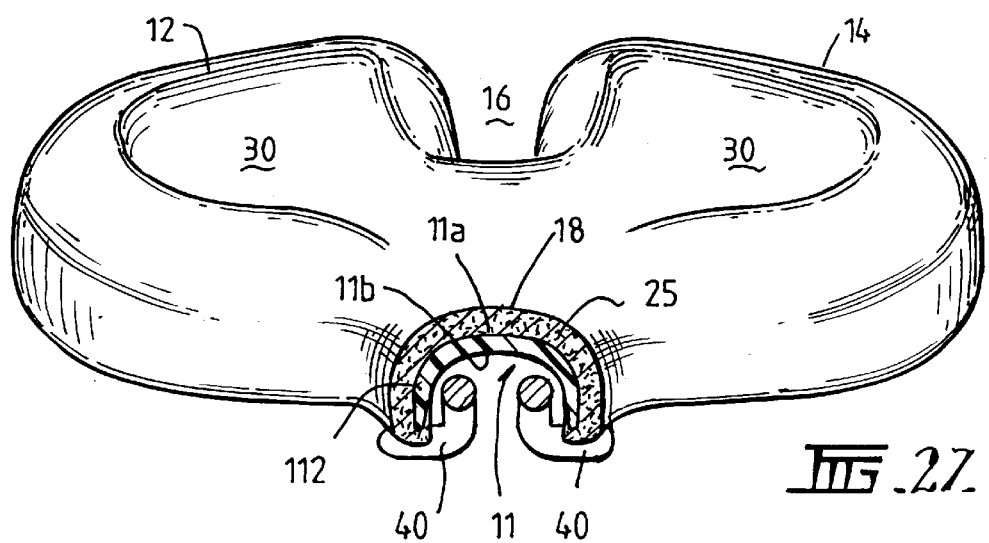
FIG. 27 is a view along the line A—A of FIG. 23.
Figure 28:
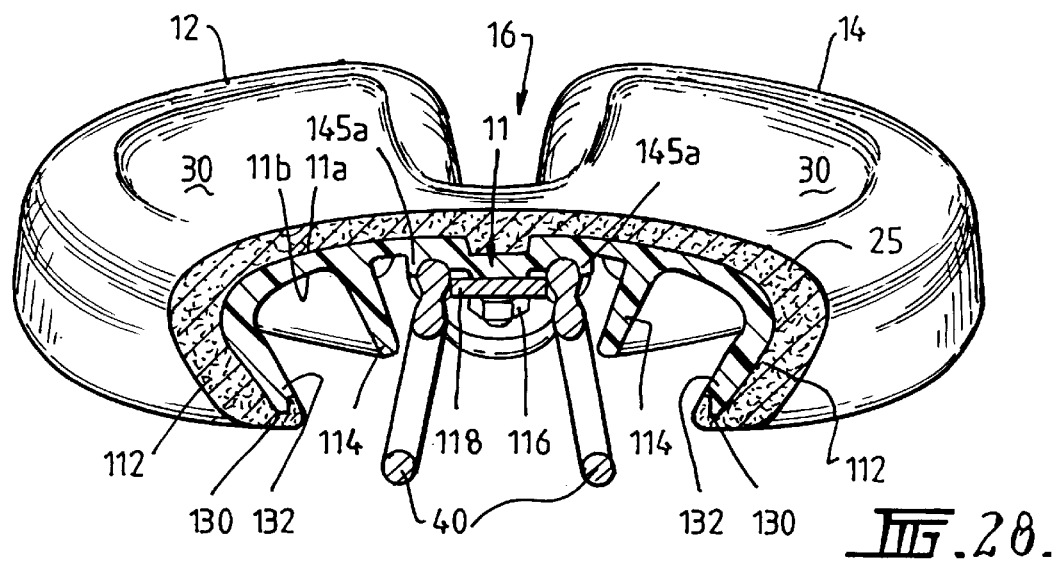
FIG. 28 is a view along the line B—B of FIG. 23.

FIGS. 27 to 29 are cross-sectional views across the seat of FIG. 23 showing the curvature of the nose portion 18 and the support portions 12 and 14 in a direction transverse to the longitudinal direction of the seat and the bicycle upon which the seat will be used.

As can be clearly seen from FIGS. 27, 28 and 29 the lower extremity 132 of the shell 11 is formed with a step 130 on the lower surface lib. Step 130 accommodates the upholstery material 25 so that the upholstery material can wrap around the bottom extremity 132 (see FIG. 28) of the shell 11 and still remain flush with the lower surface 11b of the shell 11. This assists in securing the upholstery 25 to the shell 11 by increasing the surface area and also prevents the likelihood of any contact beneath the seat rolling the upholstery from the lower extremity 132 as would more likely be the case if the upholstery 25 is not flush with the lower surface 11b of the shell 11.

The upholstery 25 is preferably formed by a self-skinning polyurethane which in a moulding process adheres or otherwise connects onto the shell 11, foams into the desired moulded shape and provides cushioning for the bicycle seat. The outer surface of the polyurethane upholstery 25 forms a firm skin formed with any desired texture. The moulding of the shell 11 and the upholstery 25 can therefore be formed in a single operation. Alternatively, upholstery 25 can be formed separately and connected to the shell 11 in a separate operation. Furtherstill, the application of the upholstery can be a combination of the two processes, for example, the cushioning can be formed in the moulding process and a outer cover or skin can be adhered onto the moulded cushioning to complete the upholstery 25. Apart from adhering the upholstery 25 to the shell 11 in a moulding operation or by a separate adhesive process, the upholstery 25 can be stapled onto the shell or otherwise fixed to the shell 11.

FIG. 29 also shows a thickened region 147 arranged directly above the rear portions 145 of the rails 40 which form the stop members, the thickened portions 147 are slightly angled as shown in FIG. 29 and provide a reinforced area on the lower surface 11b of the shell 11 so that when the seat bottoms out and contacts the end portions 145, the thickened areas 147 provide added strength to resist-any tendency for fracturing of the shell 11 and wearing through of the shell 11 due to contact between the lower surface 11b and the end portions 145. Generally the thickened areas 147 are in the form of a strip which follows the end portions 145 and arranged directly above the end portions 145 as shown in FIG. 29.

FIG. 30 shows a side view of the seat and as apparent from FIG. 30 the seat is normally positioned in a slightly inclined position. The rail 40 has a connection section 141 which will couple to a clamp assembly on a bicycle so as to connect the seat to the bicycle. The clamp assembly allows for some arcuate adjustment of the seat so that the angle and position of the seat can be adjusted from that shown in FIG. 30 between a more inclined position and a less inclined position depending on the rider's requirement. Generally a more inclined position will be used for high performance riding such as racing and a lower incline will be used for more recreational and comfortable riding.

FIG. 30 also shows the seat mounted on a bicycle generally designated by the reference numeral 200. The bicycle 200 includes a frame 201 having a sleeve or hollow socket 203, a central frame member 204 and a downwardly inclined and rearwardly extending frame member 205. Other frame components and parts of the bicycle are not shown in FIG. 30. The sleeve 203 receives in telescopic fashion, a support post 207 which can be locked in position by a nut and bolt 209 which clamps a flange portion 211 of the sleeve 203 to clamp the sleeve 203 about the post 207. The post 207 carries a clamp assembly 209 which engages the rails 40 at the portions 141. The clamp assembly 209 is clamped in position and seats on a cup-shaped support portion 210 at the top of the post 207. A bolt 212 and nut 213 pass through the portion 210 and the clamp 209 to clamp the clamp 209 to the rails 40 and also to locate the clamp portion 209 on the portion 210. By loosening the bolt 212, the rails 40 can be moved back and forward in the direction of double headed arrow H within the clamp 209 and the clamp 209 can be pivoted slightly on surface 215 of cup-shaped portion 210 to position the seat 10 shown in FIG. 30 in the desired orientation relative to the bicycle frame 201.

FIGS. 31 to 33 are cross-sectional views along the lines D—D, E—E and F—F respectively and show the contour of the nose portion 18 and support portions 12 and 14 in the direction of the longitudinal axis of the seat and bicycle upon which the seat is to be used.

FIG. 31 shows bolt 117 embedded in hole 124 in the shell 11 which receives the nut 116 to retain the bracket 118 in clamping engagement with the rail 40 to secure the rail 40 to the shell 11. FIG. 31 also shows that the nose section 18 of the shell includes the undercut 120 which is in the form of a slot or a socket for receiving front portion 122 of the rail 40. Thus, the front 22 of the rail 40 is securely held in the undercut 120 and the rear portion of the rail 40 is secured to the shell 11 by the bracket 118 so that the rail 40 is securely held to the shell 11 for mounting onto a bicycle.

FIGS. 32 and 33 show the dish-shaped contouring of the portion 12 and the fact that the contour rises upwardly to the upper periphery 110 of that portion. The raised portion 19 is also clearly shown.

As is show in FIGS. 32 and 33 the mounting bracket 40 has rearwardly extending free end sections 145 which are spaced from the lower surface 11b of the shell 11. The rear portions 145 form stop members which limit the amount of flexing movement of the portions 12 and 14 relative to one another and the nose 18 so that if a rider is pedalling the bicycle and severely high load is applied to the portions 12 and 14, such as may occur if going over bumps or the like, which would otherwise cause the portions 12 and 14 to flex about their hinges 20 and 22 to such a degree where the seat may be permanently distorted or broken, the end portions 145 will contact the lower surface 11b adjacent the portions 12 and 14 to limit the amount of movement of the portions 12 and 14 to prevent permanent distortion or breaking of the seat. The end portions 145 being spaced from the lower surface 11b of the shell 11 is also clearly shown in FIG. 29. Thus, with reference to FIG. 29, downward movement of the portions 12 and 14 in the direction of arrow M in FIG. 29 will be limited by the end portions 145. The spacing between the end portions 145 and the lower surface 11b will be dependent on the amount of movement required of the portions 12 and 14 and the material from which those portions are made.

As in the earlier embodiments the dish-shaped depressions 30 are contoured to receive the region of the anatomy where a majority of the rider's weight will be supported. The nose portion 18 is not intended to bear much, if any weight and normally sweeps downwards from the raised portion 19. The nose 18 can act to give a centring and stabilising effect by contact with the inner thighs, for example, when cornering. The ribs 114 can be positioned to control the amount of flex about the hinges 20 and 22 formed by the transition of the shell 11 from the support portions 12 and 14 to the nose portion 18. Increasing the length and size of the ribs will tend to increase stiffness and therefore decrease the amount of flexing movement provided by the hinges 20 and 22. Furthermore, by altering the direction of the ribs 114 irelative to the longitudinal axis of the bicycle and the seat the nature or the arcuate movement of the support portions 12 and 14 can change from an arcuate movement generally in a plane parallel to the longitudinal axis of the seat and the bicycle upon which the seat is mounted to arcuate movement in a more lateral direction in a plane transverse with respect to the longitudinal axis of the seat and bicycle upon which the seat is mounted. The flex is also determined by the shell design and the material of the shell. Stiffer seats may be used for racing to provide quicker energy return by the flexing movement of the portions 12 and 14 and more flexible seats can be used for recreational use to increase comfort. The direction of the flex also depends on the use. The arcuate movement may be more linear (that is, in the longitudinal direction of the seat and bicycle) for racing whilst for recreational use it may be more lateral, (that is, in a plane transverse to the longitudinal axis of the seat).

The seat may be used without the upholstery 25 in which case the shell 11 is preferably provided with a textured finish on the upper surface 11a to prevent slippage.

As previously mentioned, the shell 11 is formed most preferably by injection moulding and plastics additives such as glass fibre or the like can be added to stiffen the seat or otherwise alter the characteristics of the arcuate movement of the portions 12 and 14.

FIGS. 34 to 36 show the rail 40 in more detail.

As shown in FIGS. 34 to 35 the rail 40 includes the front portion 122 which is received in the undercut 120 of the shell 11. The front portion 122 is generally semicircular and a pair of downwardly and outwardly curved transition sections 151 which extend from the front portion 122. A pair of parallel connecting rails 141 extend from the transition sections 151 rearwardly to upwardly extending sections 153. The pair of upwardly extending sections 153 extend into a paid of rearwardly and slightly upwardly inclined sections 157 and those sections extend into outwardly extending sections 159 which, in turn, extend into the end sections 145 which form the stop members. Alternatively the sections 159 and 145 could form a continuously curved profile.

The rail portions 141 are the portions of the mounting rail 40 which couple onto a clamp arrangement of a bicycle to secure the seat to the bicycle.

The sections 157 form abutment sections which abut the lower side 11b of the shell 11 and which are engaged by the clamp bracket 118 to secure the rear portion of the mounting rail 40 to the shell 11 as has been described.

Figure 37:
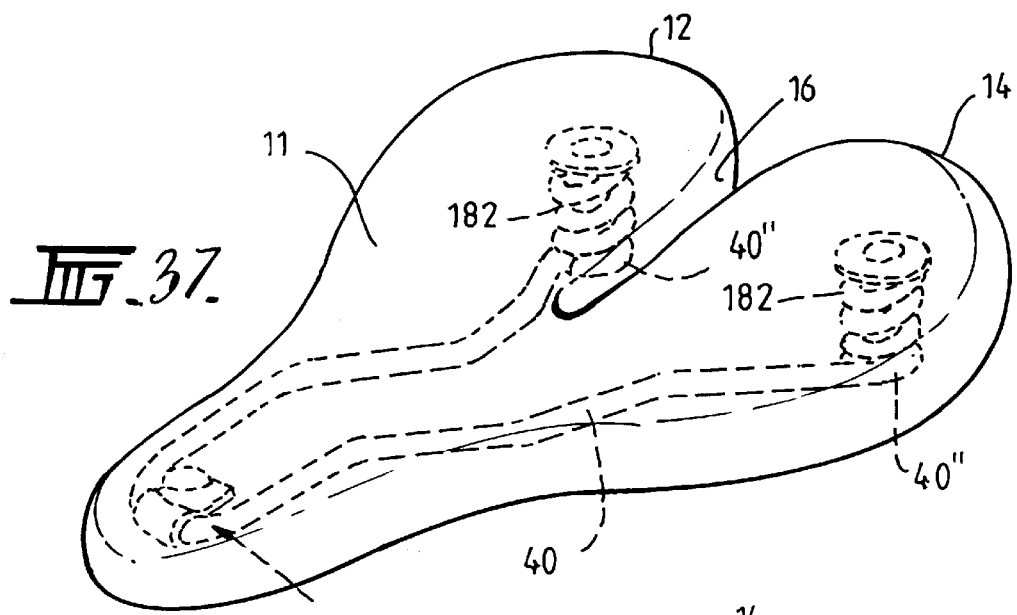
FIG. 37 is a view of a further embodiment of the invention.
Figure 38:
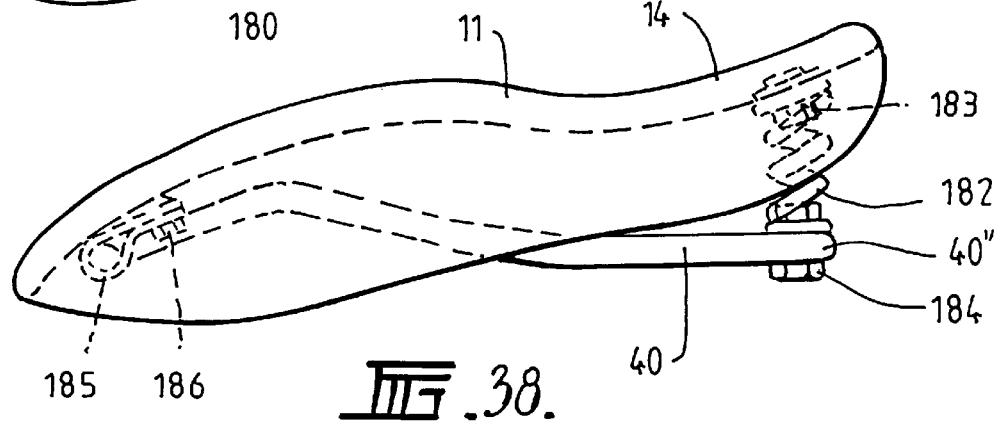
FIG. 38 is a side view of the embodiment of FIG. 37 with an additional modification shown.
Figure 39:
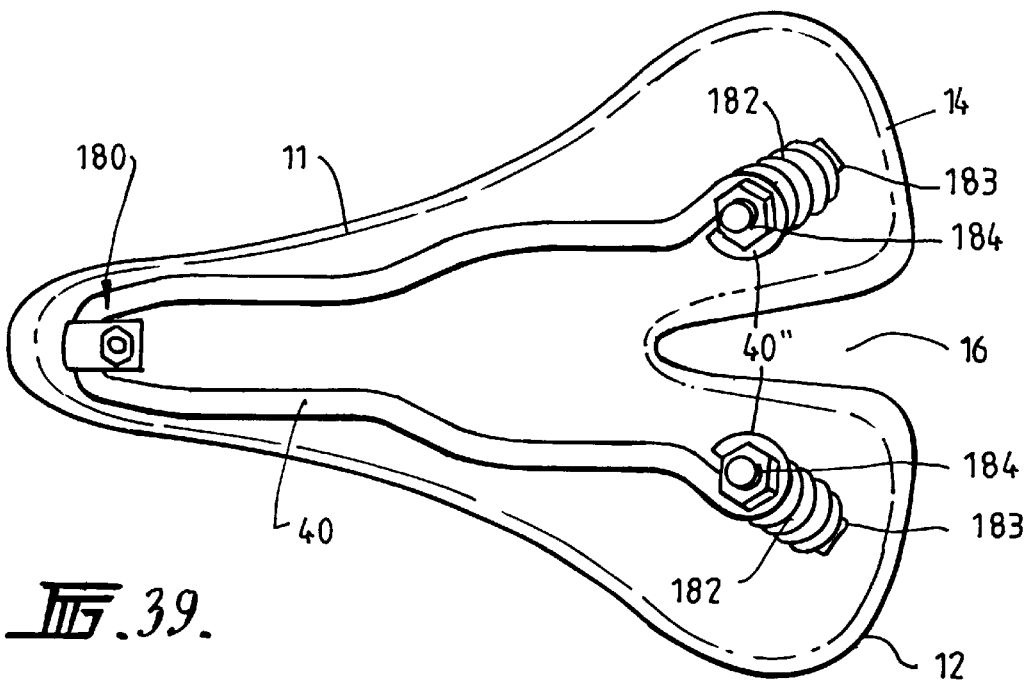
FIG. 39 is an underneath view of the embodiment of FIG. 37.

FIGS. 37, 38 and 39 show a further embodiment of the invention which is similar to the seat described with reference to FIGS. 23 to 35. The seat includes an integral shell 11 which is formed in the same manner as the above mentioned embodiment. The seat includes the integral hinge and the other features previously described. However, for ease of illustration, the shell is only schematically shown in FIGS. 37 to 39. A mounting rail 40 is coupled to the underside of the shell 11 by a nut and bracket arrangement 180. The mounting rail 40 is different to the previous embodiments in that it extends further to the rear of the seat to a position below the buttock support portions 12 and 14. Arranged between the ends 40" of the mounting rail 40 below the support portions 12 and 14 are coil springs 182. The coil springs 182 are coupled to the shell 11 by bolts 183 which can be screwed into holes formed in the shell 11 or can be embedded in the shell 11 and have nuts (not shown) coupled to the bolts for securing the coil springs 182 in place. The lower end of the coil springs 182 are connected to the ends 40" of the mounting rail 40 by a bolt and nut arrangement 184.

The seat functions in the same manner as described with reference to the embodiment of FIGS. 23 to 35 except that the springs 182 act to slightly dampen the movement of the support portions 12 and 14 and also to facilitate return of the support portions 12 and 14 during pedalling motion.

In the side view shown in FIG. 38, the front portion of the rail 40 is secured to the shell 11 in a slightly different fashion to that shown in FIG. 37. In FIG. 38, the rail 40 passes through a loop or eye 185 which in turn is connected to the shell 11 by a bolt and nut arrangement 186.

In the rear view shown in FIG. 40, the slot 16 between the support portions 12 and 14 is provided with a bridging section 187 which is flexible in nature and merely provided for aesthetic purposes. The bridging section 187 allows movement of the support portions 12 and 14 as previously described without altering or influencing the movement of those portions.

FIG. 41 shows a further embodiment similar to FIG. 37 in which the springs 182 are replaced by an integral spring 190 formed integral with the rail 40. The rail 40 may be formed from steel material and the curved portion of the rail 40 which forms the spring 190 provides the same spring effect as the coil springs 182 previously described. The rail 40 is connected to the front portion of the shell 11 in the same manner as described with reference to FIG. 39 and the end of the spring section 190 is secured to the shell 11 by locating the end 192 in a hole 194 in a boss 196 formed integral with the shell 11.

FIG. 42 shows a rear view of the embodiment of FIG. 41 but with the slot 16 omitted so that the support portions 12 and 14 are continuous and can move independently in view of the flexibility of the shell 11.

Figure 43:
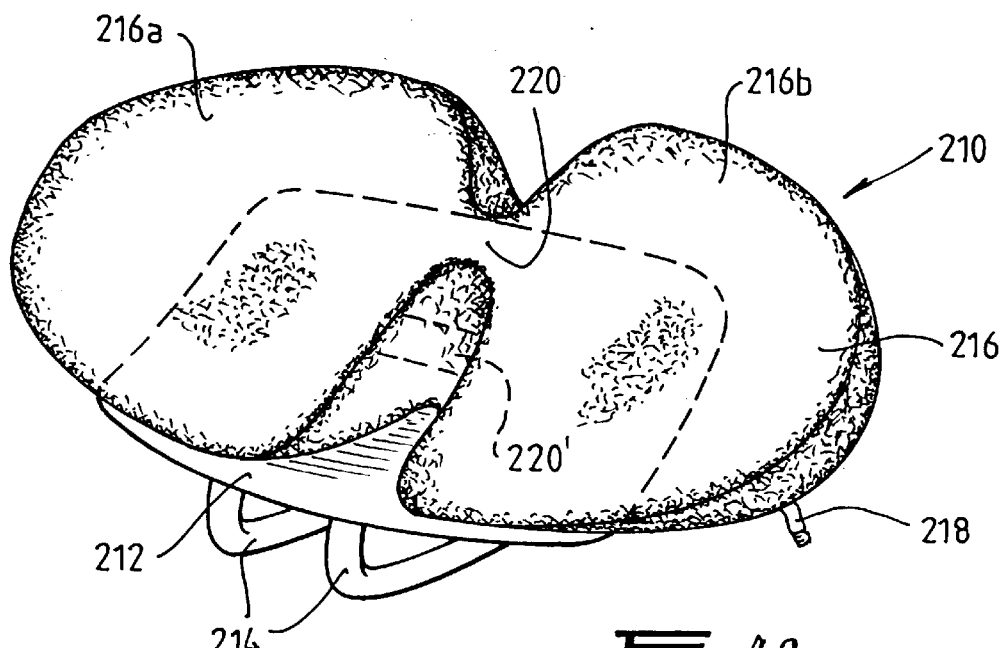
FIG. 43 is a view of a bicycle seat according to a first embodiment of the invention.

FIG. 43 shows a bicycle seat 210 according to another embodiment of the invention. The seat 210 has a base plate 212 to which is welded or otherwise secured a pair of rails 214 to enable the seat 10 to be secured to a bicycle in a manner which is well known. The base plate 212 supports an inflatable hollow housing 216. The housing 216 is preferably made from elastomeric material so that it can expand when inflated by the application of fluid to the interior of the housing 216. An inlet valve 218 is provided in the housing 216 for enabling fluid to be pumped into the housing 216 by a conventional bicycle pump or any other suitable source of pressurised fluid.

The housing 216 has two portions 216a and 216b which are joined by a bridging passage 220. The portions 216a and 216b receive a part of the buttocks of a rider and the bridging passage 220 enables fluid, preferably air, to move from one portion 216a to the other portion 216b through the passage 220 as the rider pedals and as more is supplied to one of the sections 216a or 216b than the other of the sections 216a or 216b.

The structure shown in FIG. 43 could be located on the seats shown in FIGS. 23 to 42 to act as the upholstery or cushioning for those seats.

Figure 44:
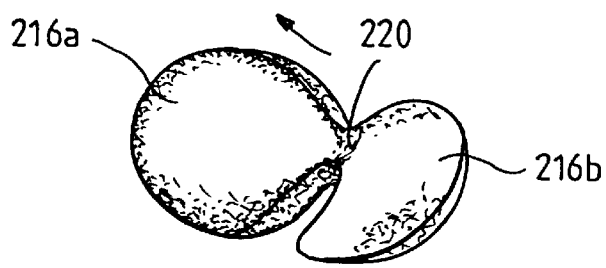
FIG. 44 is a view of the seat of FIG. 43 taking up a different configuration.

As is shown in FIG. 44, the section 216b is shown slightly compressed and collapsed due to additional weight of a rider (not shown) applied to that portion during pedalling of a bicycle. Fluid in the portion 216b therefore passes through the passage 220 into the portion 216a and the portion 216a is inflated further by the fluid which passes from the portion 216a. Thus, as pressure is applied to the portion 216b, that portion can slightly collapse under the pressure of a rider and the portion 216a which may have reduced pressure applied to it during cycling motion is able to expand to maintain support of the rider during pedalling motion. Thus, as the rider pedals, the portion 216a and 216b in turn basically collapse and expand as fluid is pushed from one portion 216a to the other portion 216b and then back from the portion 216b to the portion 216a during the pedalling motion so that the seat moves with the rider somewhat in seesaw fashion by virtue of the transfer of the fluid from the portion 216a to the portion 216b. This provides comfort to the rider because the seat is changing shape as the rider pedals and also provides support during the pedaling motion because the seat basically expands and collapses as pressure is applied and reduced to the seat during the pedalling motion.

Preferably the housing 216 is reinforced by reinforcing such as ribbing, a cell structure, a support frame or the like (not shown) so that when air is applied to the inlet valve 218 to inflate the housing 210, the housing 210 basically inflates to the share shown in FIG. 41 z fluid transfers between the portions 216a and 216b, the portions 216a and 216b inflate so that they increase in size relative to the position shown in FIG. 43 (as is shown in FIG. 44) but maintain the general shape of the portion shown in FIG. 43. That is, the portions basically enlarge in size and maintain their shape during that enlargement rather than merely totally deforming to a spherical or like shape as pressure increases in the portions 216a and 216b.

Figure 45:
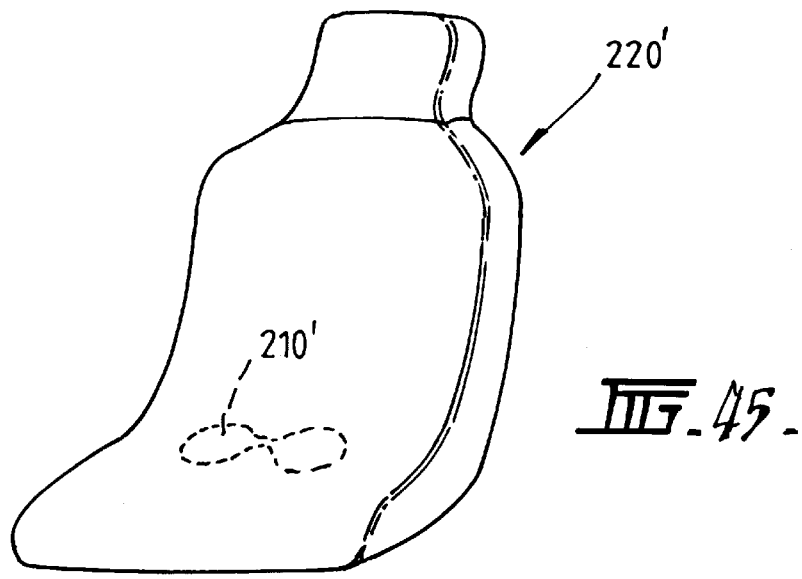
FIG. 45 is a view of a further embodiment of the invention.

FIG. 45 shows an embodiment of the invention in which a seat 220 is in the form of a normal lounge seat or car seat etc rather than a bicycle seat and wherein the housing 210' is located in the seat 220 and which operates as described with reference to FIG. 43. In this embodiment, the shape of the housing 210' may be different from that shown in FIG. 43 but as a user shifts his or her position on the seat, fluid will transfer from one part of the housing 210' to another part so that the housing expands and contracts during the movement generally in the same manner as described with reference to FIG. 43.

Figure 46:
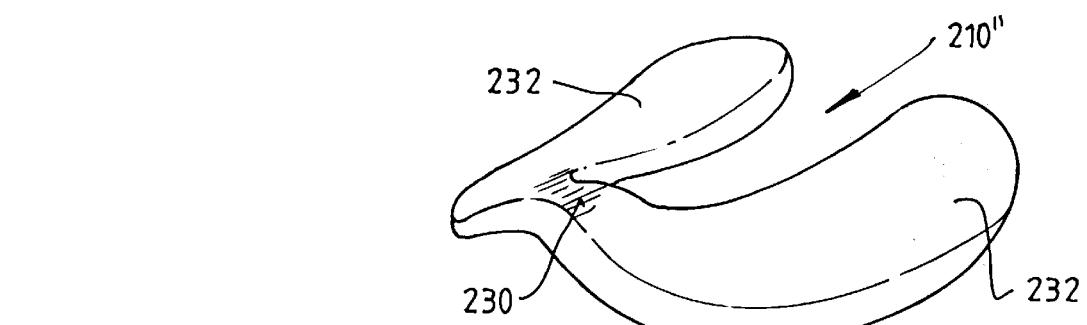
FIG. 46 shows a further embodiment of the invention.

FIG. 46 shows a further embodiment in which the seat is of slightly different shape to that shown in FIG. 43. In the embodiment of FIG. 46, the seat 210" has a pelvic area 230 and two side portions 232 which form supports for the ischial region of a rider's anatomy. The pelvic region 230 basically forms the passageway for transfer of fluid between the portions 232 in exactly the same manner as described with reference to FIG. 43.

Thus, in the embodiment of FIG. 46, the passageway 230 is basically in a different position to the passageway 220 in FIG. 43. By locating the passageway in different positions, the nature of the transfer of fluid from one portion of the housing 210 or 210' or 210" to another portion of the housing can change to slightly alter the inflation or expansion characteristics of the various portions of the housing during movement of a user on the seat.

Returning to FIG. 43, for example, if the passageway 220 was located as shown by the dotted lines in FIG. 43 and referenced by the numeral 220', more air may be applied to the front portion of the seat during fluid transfer to basically cause the front portion to inflate slightly greater than the rear portion of the seat which will change the shape characteristics slightly and therefore the nature of support during pedalling.

Figure 47:
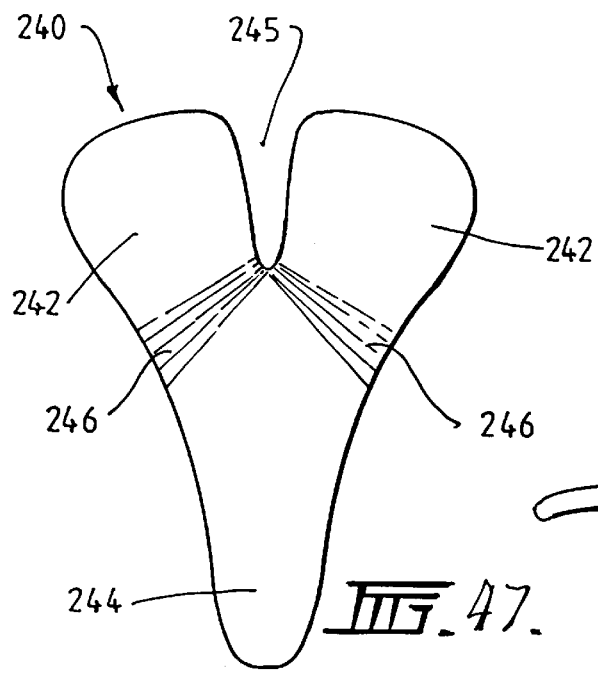
FIG. 47 is a view of a still further embodiment of the invention.

FIG. 47 shows yet a further embodiment of the invention. In the embodiment of FIG. 47, a seat 240 is shown which has a pair of buttock support sections 242 which are separated by a longitudinal slot 244. A horn section 244 joins the two buttock support sections 242 so that the seat is generally of the conventional shape of a bicycle seat except for the inclusion of the slot 244 between the buttock support sections 242. Hinge portions 246 are provided between the buttock support sections 242 and the horn section 244 and the hinge sections 246 are made from spring material such as spring metal or spring plastics material or polymers. As is shown in FIG. 48, the buttock support sections 242 are angled upwardly at an angle with respect to the horn section 244 so that when a rider seats on the seat, the buttock support sections 242 will pivot about the spring material hinge 246 under the weight and/or pressure supplied by the user.

The seat 240 may be formed from spring metal material or spring plastic material and in such an embodiment, the hinge sections 246 are merely integral portions of the seat 240 and defined by the transition areas between the buttock support sections 242 and the horn section 244. However, in other embodiments, the buttock support sections 242 and the horn section 244 may be formed from non-spring material such as aluminium plate or steel plate and the buttock support sections 242 may be connected to the horn section 244 by the hinge portions 246 which are formed from spring material such as spring steel or spring plastic material.

Figure 48:
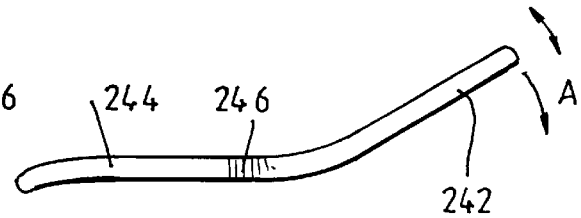
FIG. 48 is a side view of the embodiment of FIG. 47.
Figure 49:
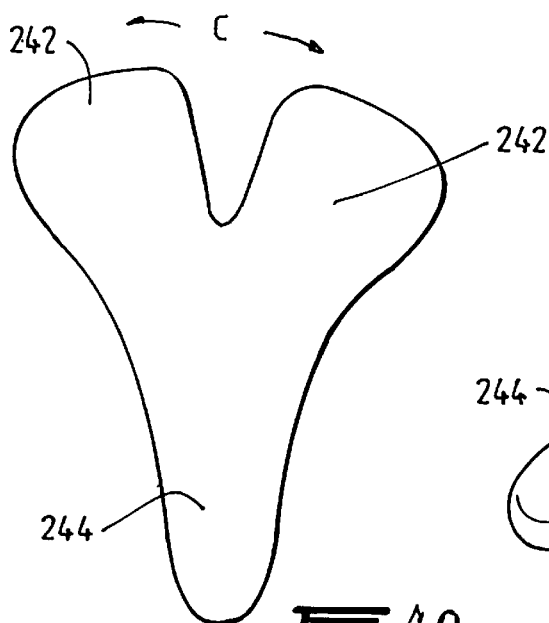
FIG. 49 is a plan view of the embodiment of FIG. 47 in a different configuration.
Figure 50:
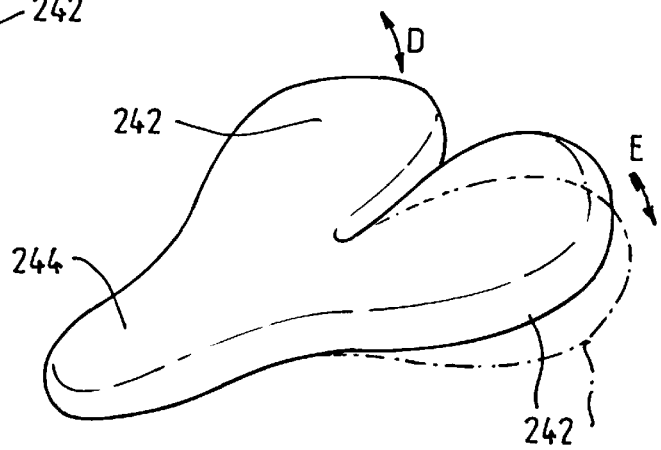
FIG. 50 is a side perspective view of the embodiments of FIG. 47.

When a user seats on the bicycle seat of FIG. 47, the buttock support sections 242 will tend to move downwardly as shown by arrow A in FIG. 48 and also slightly towards the side as shown by arrow C in FIG. 49. The separation of the buttock support sections 242 in FIG. 49 is exaggerated to show the slight sideways movement of the portion 242 as the user seats on the seat. During pedalling motion, the portions 242 will therefore tend to move upwardly and downwardly as shown by arrows D and E in FIG. 50 as the rider pedals and as pressure is applied to one of the portions 242 and then reduced and as pressure is applied to the other portion 242 so that the portions 242 basically move in paddle like or seesaw like movement during pedalling motion by the user.

The claims defining the invention are as follows:

1. A support system, including;
   a first support portion and a second support portion for receiving a riders buttocks;
   a front portion coupled to the first and second support portions; and
   a hinge between the first and second support portions and the front portion for allowing each of the first and second support portions to undergo substantially independent arcuate movement having a component at least in a substantially vertical plane when the rider is seated on the support portions and performing a pedalling motion.

2. The support system of claim 1, wherein the front portion includes a soft padding to extend the length of the truncated nose, wherein, in use, the soft padding collapses when contacted by a rider.

3. The support system of claim 1, wherein the first and second support portions are separated by a longitudinal slot.

4. The support system of claim 1, wherein the hinge comprises a first hinge between the first support portion and the front portion and a second between the second support portion and the front portion.

5. The support system of claim 1, wherein the support system includes an integral shell which includes the first and second support portions, the front portion and the hinge with the hinge being defined by a transition between the support portions and the front portion.

6. The support system of claim 5, wherein the shell is provided with upholstery which covers the shell.

7. The support system of claim 1, wherein the support system has connecting means for connecting the support system to an article, the connecting means being coupled to the front portion between a front end of the front portion and the hinge so as not to interfere with flexing movement of the hinge and the arcuate movement of the first and second support portions.

8. The support system of claim 7, wherein the connecting means comprise connecting rails.

9. The support system of claim 8, wherein the connecting rails are coupled to the shell by embedding portions of the rails into the shell when the shell is formed.

10. The support system of claim 1, wherein the support portions are cup shaped for receiving the ischial bone region and buttock region of the rider.

11. The support system of claim 1, wherein the front portion comprises a truncated nose.

12. A bicycle seat, including:
    a nose portion;
    a rear support portion coupled to the nose portion, the rear support portion having first and second support portions;
    a hinge for allowing each of the first and second support portions to undergo substantially independent movement arcuate relative to one another and the nose portion, the independent arcuate movement having a component at least in a substantially vertical plane when a rider is seated on the support portions and forming a pedalling motion; and
    stop means for limiting the amount of movement of the first and second support portions.

13. The bicycle seat of claim 12, wherein the bicycle seat includes a mounting rail for mounting the seat to a bicycle and the stop means comprises end portions of the mounting rail which are spaced from the first and second support portions and positioned below the first and second support portions.

14. A bicycle seat, including:
    a unitary shell having a nose portion and a rear portion, the shell being formed from a flexible material;
    a slot in the rear portion dividing the rear portion into two separate support portions; and
    each of the support portions being independently movable relative to the nose portion and each other by flexure of the flexible material from which the shell is formed so that a transition between the two separate support portions and the nose portion forms a hinge allowing the two separate support portions to undergo substantially independently movement when a rider is seated on the bicycle seat and pedalling a bicycle.

15. The bicycle seat of claim 14, wherein the bicycle seat includes a cushioning skin over an upper surface of the unitary shell.

16. The bicycle seat of claim 14, wherein the shell has an upper surface and a lower surface, a plurality of ribs projecting from the lower surface.

17. The bicycle seat of claim 14, wherein a mounting rail is coupled to the lower surface of the shell.

18. The bicycle seat of claim 17, wherein the mounting rail extends to a position below the support portions and a spring is arranged between the mounting rail and each support portion.

19. The bicycle seat of claim 18, wherein the spring is a coil spring which is connected to the mounting rail and to the shell.

20. The bicycle seat of claim 18, wherein the spring is integral with the mounting rail and is defined by a curved or bent portion of the mounting rail.

21. The bicycle seat of claim 14, wherein the nose portion has an undercut for receiving a front portion of the mounting rail to secure the front portion of the mounting rail to the shell.

22. The bicycle seat of claim 14, wherein stop means is provided for limiting movement of the two support portions.

\* \* \* \* \*

(12) EX PARTE REEXAMINATION CERTIFICATE (5962nd)
United States Patent
Nelson

(10) Number: US 6,254,180 C1
(45) Certificate Issued: Oct. 23, 2007

(54) BICYCLE SEAT

(75) Inventor: Paul Damien Nelson, Vic (AU)

(73) Assignee: Nelson Seating Pty Ltd., Mount Waverly, Victoria (AU)

Reexamination Request:
No. 90/007,460, Mar. 11, 2005

Reexamination Certificate for:
Patent No.: 6,254,180
Issued: Jul. 3, 2001
Appl. No.: 09/319,683
Filed: Jun. 9, 1999

(22) PCT Filed: Dec. 2, 1997

(86) PCT No.: PCT/AU97/00818
§ 371 (c)(1),
(2), (4) Date: Jun. 9, 1999

(87) PCT Pub. No.: WO98/25810
PCT Pub. Date: Jun. 18, 1998

(30) Foreign Application Priority Data

Dec. 9, 1996 (AU) ............................................. PO 4055
Mar. 12, 1997 (AU) ............................................. PO 5579
Nov. 12, 1997 (AU) ............................................. PP 0315

(51) Int. Cl.
*B62J 1/00* (2006.01)

(52) U.S. Cl. ........................................ 297/201; 297/202
(58) Field of Classification Search ....................... None
See application file for complete search history.

(56) References Cited

U.S. PATENT DOCUMENTS

| 616,178 | A | 12/1898 | Barron |
| 694,875 | A | 3/1902 | Meighan |
| 4,512,608 | A | 4/1985 | Erani |

*Primary Examiner*—Matthew C. Graham

(57) ABSTRACT

A bicycle seat is shown which includes a shell (11) formed from plastics material which has two buttock support portions (12 and 14) separated by a slot (16). The shell (18) includes a nose portion (18) and the transition between the support portions (12 and 14) and the nose portions (18) forms hinges (20 and 22) for allowing the support portions (12 and 14) to move independently with respect to one another in arcuate fashion during pedalling motion of the bicycle. A support rail (40) is coupled to the underside of the shell (18) and may have free ends (145) which act as stops to limit the amount of movement of the support portions (12 and 14). Springs (184, 190) may be provided between the mounting rail (40) and the shell (11). In other embodiments (FIGS. 42 to 80), the seal may include chambers for receiving air to cushion and provide support for a rider.

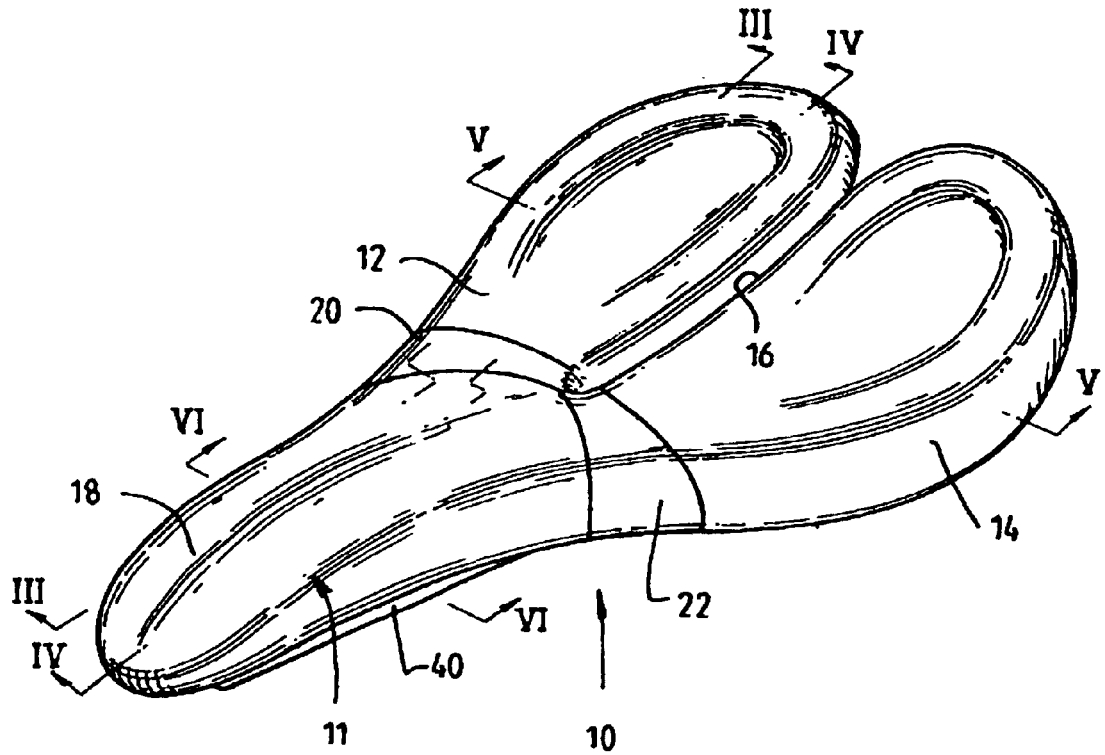

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 12–22 is confirmed.

Claim 1 is determined to be patentable as amended.

Claims 2–11, dependent on an amended claim, are determined to be patentable.

1. A support system, including;

a first support portion and a second support portion for receiving a riders buttocks;

a front portion coupled to *each of* the first and second support portions; and

[a] *at least one* hinge between *each of* the first and second support portions and the front portion for allowing each of the first and second support portions to undergo substantially independent arcuate movement having a component at least in a substantially vertical plane when the rider is seated on the support portions and performing a pedalling motion.

* * * * *